(12) United States Patent
Wu et al.

(10) Patent No.: US 12,101,278 B2
(45) Date of Patent: Sep. 24, 2024

(54) METHOD AND DEVICE IN NODES USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 366 days.

(21) Appl. No.: 17/746,919

(22) Filed: May 17, 2022

(65) Prior Publication Data

US 2022/0376881 A1    Nov. 24, 2022

(30) Foreign Application Priority Data

May 18, 2021    (CN) .......................... 202110541230.9

(51) Int. Cl.
  *H04L 5/00*    (2006.01)
(52) U.S. Cl.
  CPC .......... *H04L 5/0096* (2013.01); *H04L 5/0035* (2013.01); *H04L 5/0048* (2013.01); *H04L 5/006* (2013.01)
(58) Field of Classification Search
  CPC ..... H04L 5/006; H04L 5/0091; H04L 5/0023; H04L 5/0048; H04L 5/0096; H04L 5/0035; H04L 5/0053; H04L 5/005
  See application file for complete search history.

(56) References Cited

U.S. PATENT DOCUMENTS

2020/0313831 A1    10/2020    Kim et al.
2023/0188280 A1*   6/2023     Ji .......................... H04B 7/0628
                                                                        370/329

(Continued)

FOREIGN PATENT DOCUMENTS

CN    111147203 A    5/2020
CN    111769921 A    10/2020
CN    111901837 A    11/2020

OTHER PUBLICATIONS

First Office Action of Chinese patent application No. CN202110541230.9 dated Jan. 6, 2024.

(Continued)

*Primary Examiner* — Brian D Nguyen

(57) ABSTRACT

The present disclosure provides a method and a device in a node used for wireless communications. A first node receives a first reporting configuration and a first signaling; and transmits a first information block. The first signaling indicates a first transmission configuration state; the first information block comprises a reporting for the first reporting configuration; the first reporting configuration comprises N resource configurations; the N resource configurations respectively correspond to N first-type indexes; the first transmission configuration state corresponds to a first index; the first index is used to determine a first resource configuration; a measurement on reference signal resource(s) only in the first resource configuration among the N resource configurations is used to generate the first information block. The above method ensures that a TCI state of reference signals constantly matches with configuration information with the beams being dynamically updated.

20 Claims, 6 Drawing Sheets

(56) References Cited

U.S. PATENT DOCUMENTS

| | | | |
|---|---|---|---|
| 2023/0309147 A1* | 9/2023 | Li | H04B 17/328 |
| 2023/0344569 A1* | 10/2023 | Ji | H04L 5/0035 |
| 2024/0031044 A1* | 1/2024 | Kim | H04L 5/0048 |
| 2024/0039612 A1* | 2/2024 | Jung | H04L 5/0048 |
| 2024/0215039 A1* | 6/2024 | Dinan | H04W 72/20 |

OTHER PUBLICATIONS

First Search Report of Chinese patent application No. CN202110541230.9 dated Jan. 3, 2024.

* cited by examiner

First signaling —used to determine→ First time
FIG. 6
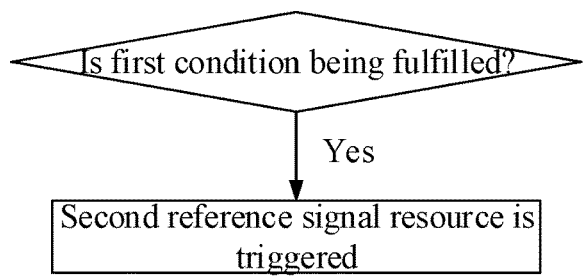
FIG. 7
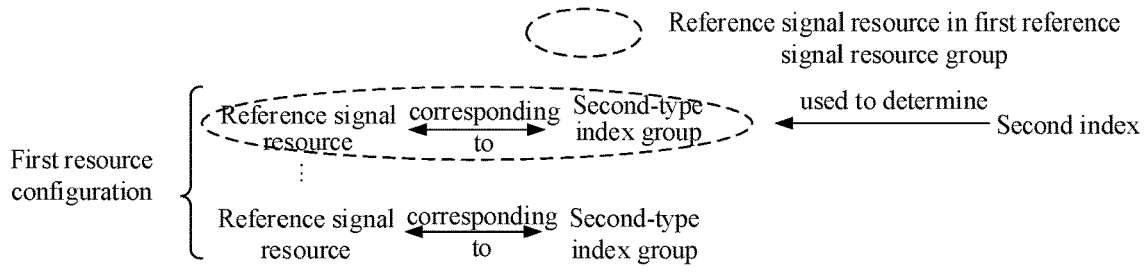
FIG. 8
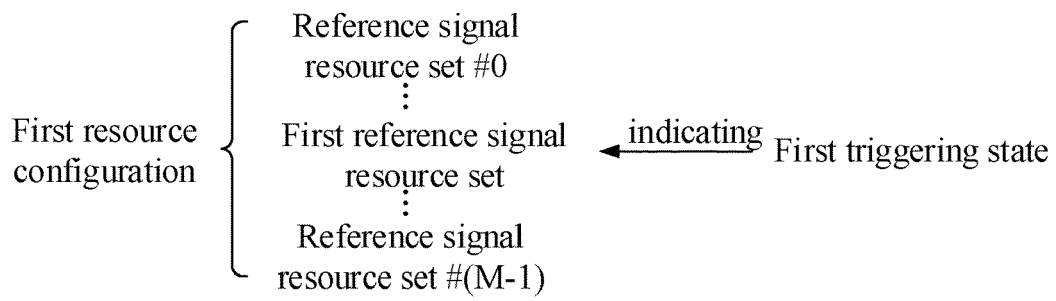
FIG. 9
Second signaling —used to trigger→ First information block
FIG. 10
First resource configuration { Reference signal resource set #0 ⋮ First reference signal resource set ⋮ Reference signal resource set #(M-1) } ←indicating— First triggering state
FIG. 11

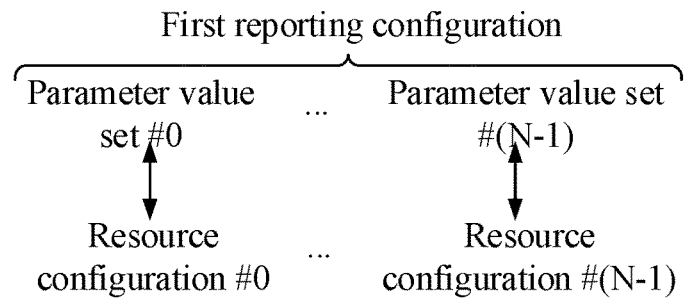
FIG. 16
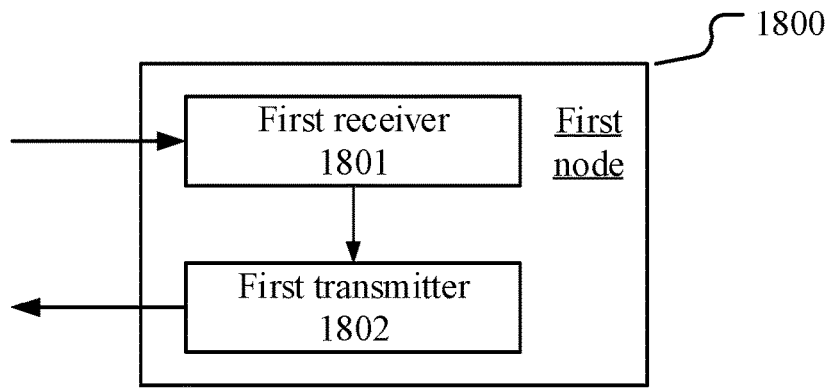
FIG. 17
FIG. 18
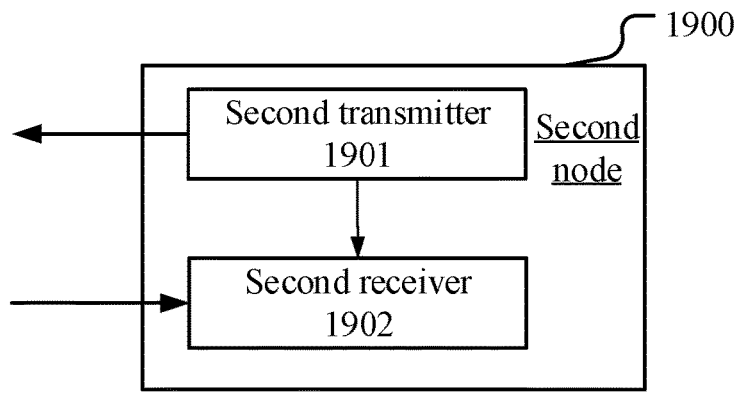
FIG. 19

METHOD AND DEVICE IN NODES USED FOR WIRELESS COMMUNICATION

CROSS REFERENCE TO RELATED APPLICATIONS

This application claims the priority benefit of Chinese Patent Application No. 202110541230.9, filed on May 18, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

The Multi-antenna technique is a crucial part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beamforming a beam pointing in a specific direction to enhance the communication quality. A beam formed by multiple antennas through beamforming is generally narrow, so both sides of communications shall be aligned with each other to ensure effective communications. When out of step/out-sync between transmitting/receiving beams occurs because of UE mobility and other factors, the communication quality will decrease drastically and even cause communication failure. In NR R (release) 15 and R16, beam management is used for beam selection, updating and indication between communication sides, which is aimed at achieving performance gains of multiple antennas.

In NR R15 and R16, a control channel and a data channel respectively adopt different beam management/indication mechanisms, and the uplink and downlink also adopt different beam management/indication mechanisms. However, in many cases the control channel and the data channel can adopt a same beam, and channel reciprocity exists between uplink and downlink channels in many application scenarios, thus, the same beam can also be adopted by these channels. Such property can be utilized to reduce the system complexity, the signaling overhead and delay to a large extent. The technique of using a physical layer signaling to simultaneously update beams for the control channel and the data channel has been adopted at the 3GPP Radio Access Network (RAN)1 #103e conference. In scenarios where reciprocity between uplink and downlink channels exists, a physical layer signaling can be used to update uplink and downlink beams at the same time. At the 3GPP RAN1 #103e conference, a proposal of using Downlink control information (DCI) with downlink grant for performing uplink/downlink beam update was approved.

SUMMARY

The applicant find through researches that if a downlink beam indicated by DCI is not only applicable to downlink data channel and downlink control channel but also to (partial) downlink reference signals, the spatial relation of the downlink reference signals will be updated dynamically. Considering that configuration information for downlink reference signals, including time-frequency resources, density and a number of reference signal ports, is semi-persistently configured by the existing standards, how to avoid mismatch between a dynamically indicated spatial relation and semi-persistently configured configuration information is a problem to be solved.

To address the above problem, the present disclosure provides a solution. It should be noted that though the present disclosure only took the cellular network as a basis and the downlink reference signal for example in the statement above, it is also applicable to other scenarios like Vehicle-to-Everything (V2X), sidelink transmissions and other reference signals, where similar technical effects as in cellular networks or scenarios of downlink reference signals can be achieved. Additionally, the adoption of a unified solution for various scenarios, including but not limited to cellular networks, V2X, sidelink communications and downlink reference signal or other reference signals, contributes to the reduction of hardcore complexity and costs. In the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first reporting configuration;
  receiving a first signaling, the first signaling indicating a first transmission configuration state, the first signaling being used to determine a first time; and
  transmitting a first information block, the first information block comprising a reporting for the first reporting configuration that occurs after the first time;
  herein, the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;

a measurement on reference signal resource(s) only in the first resource configuration among the N resource configurations is used to generate the first information block, or, the first transmission configuration state is used to determine a spatial relation of reference signal resource(s) only in the first resource configuration among the N resource configurations, or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

In one embodiment, a problem to be solved in the present disclosure includes: how to avoid mismatch between a dynamically indicated spatial relation of a downlink reference signal and configuration information which is semi-persistently configured.

In one embodiment, a problem to be solved in the present disclosure includes but is not limited to: configuration information (including but not limited to density and number of ports) of a downlink reference signal is for a Transmitter Receiver Point (TRP), while a spatial relation dynamically indicated by DCI is for another TRP, these TRPs requiring different reference signal configuration information (e.g., but not limited to, different numbers of antennas configured for two TRPs, hence different numbers of ports that are needed). Then, how to address the mismatch between configuration information for one of the TRPs and a spatial relation of the other?

In one embodiment, characteristics of the above method include that a CSI reporting is configured with multiple resource configurations, and different resource configurations employ different reference signal resource configuration information; which resource configuration and/or a spatial relation of which resource configuration is updated will be determined according to a transmission configuration state that is dynamically indicated.

In one embodiment, an advantage of the above method includes ensuring that a spatial relation employed by a reference signal resource is constantly matching with configuration information.

In one embodiment, an advantage of the above method includes ensuring that CSI being reported is obtained based on the current active TCI state, thus increasing the validity of CSI feedback and cutting overhead of CSI feedback.

According to one aspect of the present disclosure, characterized in that any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration;

a measurement on reference signal resource(s) only in the first reference signal resource group in the first resource configuration is used to generate the first information block, or, the first transmission configuration state is used to determine a spatial relation of reference signal resource(s) only in the first reference signal resource group in the first resource configuration, or, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration.

In one embodiment, characteristics of the above method include: configuring a transmission configuration state set for a reference signal resource, only when a transmission configuration state set corresponding to a reference signal resource comprises a dynamically indicated transmission configuration state can the reference signal resource be adopted and/or the spatial relation of the reference signal resource be updated.

According to one aspect of the present disclosure, characterized in comprising:
receiving a second signaling, the second signaling being used to trigger the first information block;
herein, the second signaling indicates a first triggering state, the first triggering state being used to trigger a reporting for the first reporting configuration.

According to one aspect of the present disclosure, characterized in that the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

According to one aspect of the present disclosure, characterized in comprising at least one of:
transmitting a first signal;
receiving a second signal;
herein, the first signal carries a HARQ-ACK associated with the first signaling; the first signaling comprises scheduling information for the second signal.

According to one aspect of the present disclosure, characterized in that the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

According to one aspect of the present disclosure, characterized in comprising:
receiving a second information block;
herein, the second information block is used to determine P transmission configuration states, where P is a positive integer greater than 1, the first signaling indicates the first transmission configuration state from the P transmission configuration states.

According to one aspect of the present disclosure, the first node is a UE.

According to one aspect of the present disclosure, the first node is a relay node.

The present disclosure provides a method in a second node for wireless communications, comprising:
transmitting a first reporting configuration;
transmitting a first signaling, the first signaling indicating a first transmission configuration state, the first signaling being used to determine a first time; and receiving a first information block, the first information block comprising a reporting for the first reporting configuration that occurs after the first time;

herein, the first reporting configuration comprises N resource configurations, where N is a positive integer greater than 1; the N resource configurations respectively correspond to N first-type indexes, the N first-type indexes being mutually different; any of the N resource configurations comprises at least one reference signal resource set, and any reference signal resource set in the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;

a measurement on reference signal resource(s) only in the first resource configuration among the N resource configurations is used to generate the first information block, or, the first transmission configuration state is used to determine a spatial relation of reference signal resource(s) only in the first resource configuration among the N resource configurations, or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

According to one aspect of the present disclosure, characterized in that any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration;

a measurement on reference signal resource(s) only in the first reference signal resource group in the first resource configuration is used to generate the first information block, or, the first transmission configuration state is used to determine a spatial relation of reference signal resource(s) only in the first reference signal resource group in the first resource configuration, or, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration.

According to one aspect of the present disclosure, characterized in comprising:

transmitting a second signaling, the second signaling being used to trigger the first information block;

herein, the second signaling indicates a first triggering state, the first triggering state being used to trigger a reporting for the first reporting configuration.

According to one aspect of the present disclosure, characterized in that the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

According to one aspect of the present disclosure, characterized in comprising at least one of:

receiving a first signal;

transmitting a second signal;

herein, the first signal carries a HARQ-ACK associated with the first signaling; the first signaling comprises scheduling information for the second signal.

According to one aspect of the present disclosure, characterized in that the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

According to one aspect of the present disclosure, characterized in comprising:

transmitting a second information block;

herein, the second information block is used to determine P transmission configuration states, where P is a positive integer greater than 1, the first signaling indicates the first transmission configuration state from the P transmission configuration states.

According to one aspect of the present disclosure, the second node is a base station.

According to one aspect of the present disclosure, the second node is a UE.

According to one aspect of the present disclosure, the second node is a relay node.

The present disclosure provides a first node for wireless communications, comprising:

a first receiver, receiving a first reporting configuration;

the first receiver, receiving a first signaling, the first signaling indicating a first transmission configuration state, the first signaling being used to determine a first time;

a first transmitter, transmitting a first information block, the first information block comprising a reporting for the first reporting configuration that occurs after the first time;

herein, the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;

a measurement on reference signal resource(s) only in the first resource configuration among the N resource configurations is used to generate the first information block, or, the first transmission configuration state is used to determine a spatial relation of reference signal resource(s) only in the first resource configuration among the N resource configurations, or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

The present disclosure provides a second node for wireless communications, comprising:

a second transmitter, transmitting a first reporting configuration;

the second transmitter, transmitting a first signaling, the first signaling indicating a first transmission configuration state, the first signaling being used to determine a first time;

a second receiver, receiving a first information block, the first information block comprising a reporting for the first reporting configuration that occurs after the first time;

herein, the first reporting configuration comprises N resource configurations, where N is a positive integer greater than 1; the N resource configurations respectively correspond to N first-type indexes, the N first-type indexes being mutually different; any of the N resource configurations comprises at least one reference signal resource set, and any reference signal resource set in the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;

a measurement on reference signal resource(s) only in the first resource configuration among the N resource configurations is used to generate the first information block, or, the first transmission configuration state is used to determine a spatial relation of reference signal resource(s) only in the first resource configuration among the N resource configurations, or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

In one embodiment, compared with the prior art, the present disclosure is advantageous in the following aspects:

allowing dynamic updates of the spatial relation of (partial) downlink reference signals, to reduce the delay in beam handover;

ensuring that the spatial relation of a reference signal resource is matching with its configuration information (including but not limited to time-frequency resource, density and the number of reference signal ports) all the time;

ensuring that CSI reported by the UE is obtained based on the current active TCI state, thus increasing the validity of CSI feedback and cutting overhead of CSI feedback.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first signaling used to determine a first time according to one embodiment of the present disclosure.

FIG. 7 illustrates a schematic diagram of a first transmission configuration state used to determine a spatial relation of reference signal resource(s) in a first resource configuration according to one embodiment of the present disclosure.

FIG. 8 illustrates a schematic diagram of a second reference signal resource according to one embodiment of the present disclosure.

FIG. 9 illustrates a schematic diagram of a second-type index group, a second index and a first reference signal resource group according to one embodiment of the present disclosure.

FIG. 10 illustrates a schematic diagram of a second signaling being used to trigger a first information block according to one embodiment of the present disclosure.

FIG. 11 illustrates a schematic diagram of a first triggering state, M reference signal resource sets and a first reference signal resource set according to one embodiment of the present disclosure.

FIG. 16 illustrates a schematic diagram of N parameter value sets and N resource configurations according to one embodiment of the present disclosure.

FIG. 17 illustrates a schematic diagram of a second information block according to one embodiment of the present disclosure.

FIG. 18 illustrates a structure block diagram of a processing device in a first node according to one embodiment of the present disclosure.

FIG. 19 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
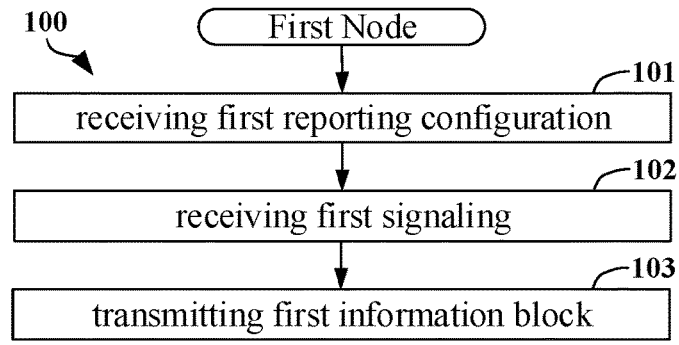
FIG. 1 illustrates a flowchart of a first reporting configuration, a first signaling and a first information block according to one embodiment of the present disclosure.

Embodiment 1 illustrates a flowchart of a first reporting configuration, a first signaling and a first information block according to one embodiment of the present disclosure, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present disclosure receives a first reporting configuration in step 101; and receives a first signaling in step 102, the first signaling indicating a first transmission configuration state, the first signaling being used to determine a first time; and transmits a first information block in step 103, the first information block comprising a reporting for the first reporting configuration that occurs after the first time. Herein, the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;
- a measurement on reference signal resource(s) only in the first resource configuration among the N resource configurations is used to generate the first information block,
- or, the first transmission configuration state is used to determine a spatial relation of reference signal resource(s) only in the first resource configuration among the N resource configurations,
- or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

In one embodiment, a measurement on reference signal resource(s) only in the first resource configuration among the N resource configurations is used to generate the first information block.

In one embodiment, a measurement on reference signal resource(s) in at least one resource configuration other than the first resource configuration among the N resource configurations is used to generate the first information block.

In one embodiment, the first transmission configuration state is used to determine a spatial relation of reference signal resource(s) only in the first resource configuration among the N resource configurations.

In one embodiment, the first transmission configuration state is used to determine a spatial relation of reference signal resource(s) in at least one resource configuration other than the first resource configuration among the N resource configurations.

In one embodiment, the first transmission configuration state is used after the first time to determine a spatial relation of reference signal resource(s) in at least one resource configuration other than the first resource configuration among the N resource configurations.

In one embodiment, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

In one embodiment, the first transmission configuration state is used after the first time to determine a spatial relation of reference signal resource(s) only in the first resource configuration among the N resource configurations.

In one embodiment, a measurement on reference signal resource(s) only in the first resource configuration among the N resource configurations is used to generate the first information block, and the first transmission configuration state is used after the first time to determine a spatial relation of reference signal resource(s) only in the first resource configuration among the N resource configurations.

In one embodiment, the first information block is unrelated to a measurement on reference signal resource(s) in any resource configuration other than the first resource configuration among the N resource configurations.

In one embodiment, a spatial relation of reference signal resource(s) in any resource configuration other than the first resource configuration among the N resource configurations is unrelated to the first transmission configuration state.

In one embodiment, a measurement on reference signal resource(s) in any resource configuration other than the first resource configuration among the N resource configurations is unrelated to the first transmission configuration state after the first time.

In one embodiment, after the first time reference signal resource(s) in any resource configuration other than the first resource configuration among the N resource configurations continues(continue) using a spatial relation before the first time.

In one embodiment, a spatial relation of reference signal resource(s) in the first resource configuration is different before and after the first time.

In one embodiment, in response to the action of receiving the first signaling, the first node determines the first resource configuration from the N resource configurations.

In one embodiment, the first reporting configuration is carried by a higher layer signaling.

In one embodiment, the first reporting configuration is carried by a Radio Resource Control (RRC) signaling.

In one embodiment, the first reporting configuration is carried by a Medium Access Control layer Control Element (MAC CE) signaling.

In one embodiment, the first reporting configuration is jointly carried by an RRC signaling and a MAC CE signaling.

In one embodiment, the first reporting configuration comprises a Channel State Information (CSI) reporting configuration.

In one embodiment, the first reporting configuration is a CSI reporting configuration.

In one embodiment, the first reporting configuration comprises information in all or partial fields in an Information Element (IE).

In one embodiment, the first reporting configuration is an IE.

In one embodiment, the first reporting configuration is an IE, where names of the first reporting configuration include "CSI-Report".

In one embodiment, the first reporting configuration comprises information in all or partial fields in a CSI-ReportConfig IE.

In one embodiment, the first reporting configuration is a CSI-ReportConfig IE.

In one embodiment, the first reporting configuration is periodic.

In one embodiment, the first reporting configuration is semi-persistent.

In one embodiment, the first reporting configuration is aperiodic.

In one embodiment, a value of a higher layer parameter "reportQuantity" associated with the first reporting configuration belongs to the first higher layer parameter value set.

In one subembodiment, the first higher layer parameter value set comprises "cri-RI-i1", "cri-RI-i1-CQI", "cri-RI-CQI" and "cri-RI-LI-PMI-CQI".

In one subembodiment, the first higher layer parameter value set comprises "cri-RI-i1", "cri-RI-i1-CQI", "cri-RI-CQI", "cri-RI-LI-PMI-CQI" and "none".

In one subembodiment, the first higher layer parameter value set consists of "cri-RI-i1", "cri-RI-i1-CQI", "cri-RI-CQI" and "cri-RI-LI-PMI-CQI".

In one subembodiment, the first higher layer parameter value set consists of "cri-RI-i1", "cri-RI-i1-CQI", "cri-RI-CQI", "cri-RI-LI-PMI-CQI" and "none".

In one subembodiment, the first higher layer parameter value set does not comprise "cri-RSRP" or "cri-SINR".

In one embodiment, the N resource configurations are respectively N CSI resource configurations.

In one embodiment, any of the N resource configurations comprises information in all or partial fields in an IE.

In one embodiment, any of the N resource configurations is an IE.

In one embodiment, any of the N resource configurations is an IE, and names of any of the N resource configurations include "CSI-Resource".

In one embodiment, any of the N resource configurations is a CSI-ResourceConfig IE.

In one embodiment, the first reporting configuration comprises a first higher layer parameter, and the first higher layer parameter comprised in the first reporting configuration indicates the N resource configurations; names of the first higher layer parameter include "ChannelMeasurement".

In one subembodiment, the first higher layer parameter is a higher-layer parameter "re sourcesForChannelMeasurement".

In one subembodiment, the first higher layer parameter in the first reporting configuration respectively indicates identifiers of the N resource configurations.

In one subembodiment, the first higher layer parameter in the first reporting configuration sequentially indicates the N resource configurations.

In one embodiment, the first reporting configuration comprises a first higher layer parameter and a second higher layer parameter, the first higher layer parameter comprised in the first reporting configuration indicates some of the N resource configurations while the second higher layer parameter comprised in the first reporting configuration indicates the others of the N resource configurations; names of the first higher layer parameter include "ChannelMeasurement", while names of the second higher layer parameter include "ForInterference".

In one embodiment, any of the N resource configurations is used for a channel measurement on the first reporting configuration.

In one embodiment, there is a resource configuration among the N resource configurations being used for an interference measurement on the first reporting configuration.

In one embodiment, reference signal resources used for channel measurement associated with the first reporting configuration comprise reference signal resources in the N resource configurations.

In one embodiment, reference signal resources associated with the first reporting configuration only comprise reference signal resources in the N resource configurations.

In one embodiment, reference signal resources used for channel measurement associated with the first reporting configuration only comprise reference signal resources in the N resource configurations.

In one embodiment, reference signal resources associated with the first reporting configuration comprise at least one reference signal resource other than reference signal resources in the N resource configurations.

In one embodiment, reference signal resources used for channel measurement associated with the first reporting configuration comprise at least one reference signal resource other than reference signal resources in the N resource configurations.

In one embodiment, the N resource configurations are respectively identified by N first-type identifiers, where the first-type identifiers are non-negative integers.

In one subembodiment, the first-type identifier is a CSI-ResourceConfigId.

In one subembodiment, the first-type identifier is no greater than 111.

In one subembodiment, the N first-type identifiers are mutually unequal.

In one embodiment, the N first-type identifiers are respectively identifiers of the N resource configurations.

In one embodiment, any reference signal resource in the N resource configurations comprises a Channel State Information-Reference Signal (CSI-RS) resource.

In one embodiment, any reference signal resource in the N resource configurations comprises a CSI-RS resource set.

In one embodiment, any reference signal resource in the N resource configurations comprises a Non-Zero-Power (NZP) CSI-RS resource.

In one embodiment, any reference signal resource in the N resource configurations is a CSI-RS resource.

In one embodiment, any reference signal resource in the N resource configurations is an NZP CSI-RS resource.

In one embodiment, any reference signal resource in the N resource configurations comprises at least one reference signal port.

In one subembodiment, the reference signal port is a CSI-RS port.

In one subembodiment, the reference signal port is an antenna port.

In one embodiment, any reference signal resource in the N resource configurations is identified by a second-type identifier; the second-type identifier being a non-negative integer.

In one subembodiment, the second-type identifier is an NZP-CSI-RS-ResourceId.

In one subembodiment, the second-type identifier is an NZP-CSI-RS-ResourceSetId.

In one subembodiment, the second-type identifier is no greater than 191.

In one subembodiment, any two reference signal resources in the N resource configurations correspond to unequal second-type identifiers.

In one subembodiment, there are two reference signal resources in the N resource configurations corresponding to equal second-type identifiers.

In one subembodiment, any two reference signal resources belonging to a same resource configuration among the N resource configurations correspond to unequal second-type identifiers.

In one subembodiment, there are two reference signal resources belonging to different resource configurations in the N resource configurations corresponding to equal second-type identifiers.

In one embodiment, the N resource configurations correspond to a same time-domain behavior.

In one embodiment, the time domain behavior includes one that is periodic, semi-persistent or aperiodic.

In one embodiment, any of the N resource configurations comprises configuration information for each reference signal resource in the any resource configuration.

In one embodiment, the configuration information for a reference signal resource comprises all or part of time-domain resources, frequency-domain resources, a Code Division Multiplexing (CDM) type, a CDM group, a scramblingID, a cycle, a Quasi Co-Location (QCL) relation, density or a number of ports.

In one embodiment, the N resource configurations respectively comprise N first-type higher layer parameters, where the N first-type higher layer parameters respectively indicate the N first-type indexes.

In one embodiment, any of the N resource configurations comprises a second-type higher layer parameter, the second-type higher layer parameter in the any resource configuration indicates a time domain behavior corresponding to the any resource configuration.

In one subembodiment, names of the second-type higher-layer parameter include "resourceType".

In one subembodiment, the second-type higher layer parameter in the any resource configuration indicates a time domain behavior of each reference signal resource in the any resource configuration.

In one embodiment, the N resource configurations are for a same Carrier.

In one embodiment, the N resource configurations are for a same BandWidth Part (BWP).

In one embodiment, any of the N resource configurations comprises a third-type higher layer parameter, the third-type higher layer parameter indicating a frequency interval; the third-type higher layer parameters comprised in the N resource configurations indicate a same frequency interval.

In one subembodiment, the frequency interval is a carrier.

In one subembodiment, the frequency interval is a BWP.

In one embodiment, the N first-type indexes are respectively non-negative integers.

In one embodiment, the N first-type indexes comprise a Physical Cell Identity (PCI).

In one embodiment, at least one of the N first-type indexes is a PCI.

In one embodiment, the N first-type indexes are respectively N PCIs.

In one embodiment, the N first-type indexes comprise a CellIdentity.

In one embodiment, the N first-type indexes comprise a SCellIndex.

In one embodiment, at least one of the N first-type indexes is a SCellIndex.

In one embodiment, the N first-type indexes are respectively N SCellIndexes.

In one embodiment, the SCellIndex is a positive integer no greater than 31.

In one embodiment, the N first-type indexes comprise a ServCellIndex.

In one embodiment, at least one of the N first-type indexes is a ServCellIndex.

In one embodiment, the N first-type indexes are respectively N ServCellIndexes.

In one embodiment, the ServCellIndex is a non-negative integer no greater than 31.

In one embodiment, any of the N first-type indexes is comprised of Q1 bits.

In one embodiment, the N first-type indexes comprise two parts, any first-type index in one part being comprised of Q1 bits while any first-type index in the other being comprised of Q2 bits; Q1 is greater than Q2.

In one subembodiment, the N first-type indexes are made up of the two parts.

In one subembodiment, among the N first-type indexes there is one first-type index not belonging to the two parts.

In one embodiment, Q1 is equal to 10.

In one embodiment, Q1 is equal to 28.

In one embodiment, Q1 is equal to 9.

In one embodiment, Q2 is equal to 5.

In one embodiment, Q2 is equal to 3.

In one embodiment, value of the first-type index is no greater than 2 to the Q1-th power.

In one embodiment, the phrase that all reference signal resources in any resource configuration are associated with a same cell includes a meaning that: a PCI of the same cell is used to generate reference signals corresponding to all reference signal resources in the any resource configuration.

In one embodiment, the phrase that all reference signal resources in any resource configuration are associated with a same cell includes a meaning that: any reference signal resource in the any resource configuration and a Synchronisation Signal (SS)/physical broadcast channel (PBCH) Block for the same cell are Quasi Co-Located.

In one embodiment, the phrase that all reference signal resources in any resource configuration are associated with a same cell includes a meaning that: all reference signal resources in the any resource configuration are transmitted by the same cell.

In one embodiment, the phrase that all reference signal resources in any resource configuration are associated with a same cell includes a meaning that: a radio resource occupied by any reference signal resource in the any resource configuration is indicated by a configuration signaling, a Radio Link Control (RLC) Bearer through which the configuration signaling is delivered is configured by a CellGroupConfig IE, and a Special Cell (SpCell) configured by the CellGroupConfig IE includes the same cell.

In one subembodiment, the configuration signaling comprises an RRC signaling.

In one subembodiment, the radio resource comprises time-frequency resources.

In one subembodiment, the radio resource comprises an RS sequence.

In one subembodiment, the radio resource comprises code-domain resources.

In one embodiment, the same cell is a serving cell of the first node.

In one embodiment, the same cell is a serving cell or a non-serving cell of the first node.

In one embodiment, the first-type index corresponding to the any resource configuration is a PCI of the same cell.

In one embodiment, the first-type index corresponding to the any resource configuration is a SCellIndex of the same cell.

In one embodiment, the first-type index corresponding to the any resource configuration is a ServCellIndex of the same cell.

In one embodiment, among the N resource configurations there is a resource configuration in which all reference signal resources are associated with a cell that is a serving cell of the first node.

In one embodiment, among the N resource configurations there is a resource configuration in which all reference signal resources are associated with a cell that is a non-serving cell of the first node.

In one embodiment, among the N resource configurations there are two resource configurations, where all reference signal resources in one of the two resource configurations and all reference signal resources in the other are respectively associated with two different cells.

In one subembodiment, the two different cells are respectively serving cells of the first node.

In one subembodiment, the two different cells are respectively non-serving cells of the first node.

In one subembodiment, one of the two different cells is a serving cell of the first node, while the other of the two different cells is a non-serving cell of the first node.

In one subembodiment, the two different cells correspond to different PCIs.

In one subembodiment, the two different cells correspond to different SCellIndexes.

In one subembodiment, the two different cells correspond to different ServCellIndexes.

In one embodiment, the phrase that a cell is a serving cell of the first node includes a meaning that the first node performs SCell addition for the cell.

In one embodiment, the phrase that a cell is a serving cell of the first node includes a meaning that a latest sCellToAddModList received by the first node comprises the cell.

In one embodiment, the phrase that a cell is a serving cell of the first node includes a meaning that a latest sCellToAddModList or sCellToAddModListSCG received by the first node comprises the cell.

In one embodiment, the phrase that a cell is a serving cell of the first node includes a meaning that the first node is allocated with a SCellIndex for the cell.

In one embodiment, the phrase that a cell is a serving cell of the first node includes a meaning that the first node is allocated with a ServCellIndex for the cell.

In one embodiment, the phrase that a cell is a serving cell of the first node includes a meaning that an RRC connection has been established between the first node and the cell.

In one embodiment, the phrase that a cell is a serving cell of the first node includes a meaning that a Cell-Radio Network Temporary Identifier (C-RNTI) of the first node is allocated by the cell.

In one embodiment, the phrase that a cell is a non-serving cell of the first node includes a meaning that the first node performs no SCell addition for the cell.

In one embodiment, the phrase that a cell is a non-serving cell of the first node includes a meaning that a latest sCellToAddModList received by the first node does not comprise the cell.

In one embodiment, the phrase that a cell is a non-serving cell of the first node includes a meaning that neither a latest sCellToAddModList nor a latest sCellToAddModListSCG received by the first node comprises the cell.

In one embodiment, the phrase that a cell is a non-serving cell of the first node includes a meaning that the first node is not allocated with a SCellIndex for the cell.

In one embodiment, the phrase that a cell is a non-serving cell of the first node includes a meaning that the first node is not allocated with a ServCellIndex for the cell.

In one embodiment, the phrase that a cell is a non-serving cell of the first node includes a meaning that the cell is not a Primary Cell (PCell) of the first node.

In one embodiment, the phrase that a cell is a non-serving cell of the first node includes a meaning that an RRC connection hasn't been established between the first node and the cell.

In one embodiment, the phrase that a cell is a non-serving cell of the first node includes a meaning that a C-RNTI of the first node is not allocated by the cell.

In one embodiment, the first transmission configuration state is a Transmission Configuration Indicator (TCI).

In one embodiment, the first transmission configuration state indicates a QCL relation.

In one embodiment, the first transmission configuration state indicates the target reference signal resource group, the target reference signal resource group comprising at least a first target reference signal resource.

In one embodiment, the first transmission configuration state comprises parameters used for configuring QCL relations between the target reference signal resource group and a DMRS port for a physical layer data channel, a DMRS port for a physical layer control channel, or a reference signal port for reference signal resources.

In one embodiment, the physical layer data channel comprises a Physical Downlink Shared CHannel (PDSCH).

In one embodiment, the physical layer data channel comprises a Physical Uplink Shared CHannel (PUSCH).

In one embodiment, the physical layer control channel comprises a Physical Downlink Control Channel (PDCCH).

In one embodiment, the physical layer control channel comprises a Physical Uplink Control Channel (PUCCH).

In one embodiment, the reference signal resource comprises a CSI-RS resource.

In one embodiment, the reference signal port comprises a CSI-RS port.

In one embodiment, the reference signal resource comprises a Sounding Reference Signal (SRS) resource.

In one embodiment, the reference signal port comprises an SRS port.

In one embodiment, the first transmission configuration state indicates a QCL type corresponding to the first target reference signal resource.

In one embodiment, the first transmission configuration state indicates that a QCL type corresponding to the first target reference signal resource is TypeD.

In one embodiment, the target reference signal resource group only comprises the first target reference signal resource.

In one embodiment, the target reference signal resource group comprises a second target reference signal resource besides the first target reference signal resource; the first transmission configuration state indicates that the first target reference signal resource and the second target reference signal resource correspond to different QCL types.

In one embodiment, the first target reference signal resource comprises a CSI-RS resource.

In one embodiment, the first target reference signal resource comprises a SS/PBCH Block resource.

In one embodiment, the first target reference signal resource comprises an SRS resource.

In one embodiment, the second target reference signal resource comprises a CSI-RS resource.

In one embodiment, the second target reference signal resource comprises a SS/PBCH Block resource.

In one embodiment, the second target reference signal resource comprises an SRS resource.

In one embodiment, the first transmission configuration state indicates an index of each reference signal resource in the target reference signal resource group, where an index of any reference signal resource in the target reference signal resource group is a NZP-CSI-RS-ResourceId or an SSB-Index.

In one embodiment, the QCL type includes TypeA, TypeB, TypeC and TypeD.

In one embodiment, the first transmission configuration state indicates the first target reference signal resource, the first target reference signal resource being associated with a first cell, the first index being used to identify the first cell.

In one embodiment, the first transmission configuration state indicates the first target reference signal resource and the second target reference signal resource, the first target reference signal resource and the second target reference signal resource being associated with a first cell, the first index being used to identify the first cell.

In one embodiment, the first index is a PCI of the first cell.

In one embodiment, the first index is a SCellIndex of the first cell.

In one embodiment, the first index is a ServCellIndex of the first cell.

In one embodiment, the first index is a non-negative integer.

In one embodiment, the first index is equal to one of the N first-type indexes.

In one embodiment, the first resource configuration is one of the N resource configurations.

In one embodiment, the first resource configuration is one of the N resource configurations of which a corresponding first-type index is equal to the first index.

In one embodiment, before the first time, a second transmission configuration state is used to determine a spatial relation of reference signal resource(s) in the first resource configuration; after the first time, the first transmission configuration state replaces the second transmission configuration state to be used to determine a spatial relation of reference signal resource(s) in the first resource configuration.

In one embodiment, the second transmission configuration state is a TCI state.

In one embodiment, the second transmission configuration state indicates a QCL relation.

In one embodiment, the first transmission configuration state indicates the first target reference signal resource and indicates that a QCL type corresponding to the first target reference signal resource is TypeD; the second transmission configuration state indicates a fourth reference signal resource and indicates that a QCL type corresponding to the fourth reference signal resource is TypeD; the first target reference signal resource and the fourth reference signal resource are not Quasi Co-Located.

In one embodiment, the first resource configuration indicates the second transmission configuration state.

In one embodiment, the second transmission configuration state is configured by an RRC signaling.

In one embodiment, the second transmission configuration state is configured by a MAC CE signaling.

In one embodiment, the second transmission configuration state is indicated by a dynamic signaling.

In one embodiment, the first triggering state indicates the second transmission configuration state.

In one embodiment, the phrase of a reporting for the first reporting configuration means that the first node will acquire a channel measurement used for calculating a CSI value carried by the reporting based on a reference signal resource indicated by a first higher layer parameter in the first reporting configuration; names of the first higher layer parameter include "ChannelMeasurement".

In one embodiment, the phrase of a reporting for the first reporting configuration means that the content of CSI comprised in the reporting is indicated by a third higher layer parameter of the first reporting configuration, names of the third higher layer parameter including "reportQuantity".

In one embodiment, the content of the CSI comprises one or more of a Channel Quality Indicator (CQI), a Precoding Matrix Indicator (PMI), a CSI-RS Resource Indicator (CRI), a Layer Indicator (LI), a Rank Indicator (RI), a SS/PBCH Block Resource Indicator (SSBRI), a Layer 1 Reference Signal received power (L1-RSRP) or a Signal-to-Interference and Noise Ratio (L1-SINR).

In one embodiment, the phrase of a reporting for the first reporting configuration means that a higher layer parameter "reportSlotConfig" or "reportSlotOffsetList" of the first reporting configuration is used to determine slots occupied by the reporting.

In one embodiment, the phrase of a reporting for the first reporting configuration means that a higher layer parameter "pucch-CSI-ResourceList" of the first reporting configuration is used to determine a PUCCH resource occupied by the reporting.

In one embodiment, the phrase of a reporting for the first reporting configuration means that the first reporting configuration indicates a value used to configure each higher layer parameter in a higher layer parameter group corresponding to the reporting.

In one subembodiment, the higher layer parameter group comprises all or part of "reportFreqConfiguration", "timeRestrictionForChannelMeasurements", "timeRestrictionForInterferenceMeasurements", "cqi-Table", "subbandSize", "codebookConfig", "groupBasedBeamReporting" or "non-PMI-PortIndication".

In one embodiment, the first information block comprises a CSI reporting.

In one embodiment, the first information block comprises a CSI reporting for the first reporting configuration.

In one embodiment, a start time for time-domain resources occupied by the first information block is later than the first time.

In one embodiment, time-domain resources occupied by the first information block are within a duration in which the first transmission configuration state is applicable.

In one embodiment, the first information block comprises a reporting for the first reporting configuration within a duration in which the first transmission configuration state is applicable.

In one embodiment, a CSI reference source corresponding to the first information block is later than an occurrence of a reference signal resource in the first resource configuration after the first time.

In one embodiment, a CSI reference source corresponding to the first information block is later than an occurrence of any reference signal resource in the first resource configuration after the first time.

In one embodiment, a CSI reference source corresponding to the first information block is later than the first time.

In one embodiment, the first reporting configuration is periodic or semi-persistent; the first information block comprises a reporting for the first reporting configuration that occurs after the first time.

In one embodiment, the first reporting configuration is periodic or semi-persistent; the first information block comprises a reporting for the first reporting configuration within a duration in which the first transmission configuration state is applicable In one embodiment, the first reporting configuration is aperiodic; the first information block comprises a reporting on a trigger for the first reporting configuration that occurs after the first time.

In one embodiment, the first reporting configuration is aperiodic; the first information block comprises a reporting on a trigger for the first reporting configuration within a duration in which the first transmission configuration state is applicable.

In one embodiment, the first information block is carried by a physical layer signaling.

In one embodiment, the first information block comprises CSI.

In one embodiment, the first information block comprises one or more of a CQI, a PMI, a CRI, a LI or a RI.

In one embodiment, the first information block comprises one or more of a CQI, a PMI, a CRI or a RI.

In one embodiment, the first information block comprises one or more of a CQI, a PMI or a RI.

In one embodiment, the first information block doesn't comprise an SSBRI, a L1-RSRP or a L1-SINR.

In one embodiment, the first information block comprises one or more of an SSBRI, a L1-RSRP or a L1-SINR.

In one embodiment, the first information block comprises Uplink control information (UCI).

In one embodiment, the first signaling comprises a physical-layer signaling.

In one embodiment, the first signaling is a physical layer signaling.

In one embodiment, the first signaling comprises a layer 1 (L1) signaling.

In one embodiment, the first signaling comprises DownLink Control Information (DCI).

In one embodiment, the first signaling is DCI.

In one embodiment, the first signaling comprises one or more fields in a DCI.

In one embodiment, the first signaling comprises DCI for DownLink Grant.

In one embodiment, the first signaling comprises DCI for indication of a TCI state.

In one embodiment, the first signaling comprises DCI for indication of a downlink TCI state.

In one embodiment, a DCI format for the first signaling is one of DCI format 1_0, DCI format 1_1 or DCI format 1_2.

In one embodiment, Cyclic Redundancy Check (CRC) of the first signaling is scrambled by a C-RNTI.

In one embodiment, the first signaling indicates a TCI codepoint corresponding to the first transmission configuration state.

In one embodiment, the first signaling comprises a first field, and the first field in the first signaling indicates the first transmission configuration state; the first field comprises at least one bit.

In one embodiment, a number of bit(s) comprised in the first field is equal to 1, 2 or 3.

In one embodiment, the first field comprises all or partial information in a Transmission configuration indication field.

In one embodiment, the first field is a Transmission configuration indication field in DCI.

In one embodiment, the first field indicates a TCI state.

In one embodiment, the first field indicates one or two TCI states.

In one embodiment, a value of the first field in the first signaling is equal to a TCI codepoint corresponding to the first transmission configuration state.

In one embodiment, the first transmission configuration state is an applicable transmission configuration state after the first time.

In one embodiment, the first transmission configuration state is used to determine a QCL relation of DMRS of a UE-dedicated PDSCH for the first node and QCL relations of all or partial COntrol REsource SETs (CORESETs) after the first time.

In one embodiment, the first transmission configuration state is used to determine a QCL relation of DMRS of a UE-dedicated PDSCH for the first node on a first frequency band and QCL relations of all or partial CORESETs on the first frequency band after the first time.

In one embodiment, the first transmission configuration state is used to determine QCL relations of all CORESETs belonging to a first CORESET pool on a first frequency band and a QCL relation of DMRS of a UE-dedicated PDSCH scheduled by a PDCCH of CORESETs belonging to the first CORESET pool on the first frequency band after the first time; the first CORESET pool comprises at least one CORESET after the first time.

In one embodiment, the first transmission configuration state is used to determine a spatial domain transmission filter for a PUSCH based on dynamic-grant or configured-grant for the first node and a spatial domain transmission filter for all or partial dedicated PUCCH resources after the first time.

In one embodiment, the first transmission configuration state is used to determine a spatial domain transmission filter for a PUSCH based on dynamic-grant or configured-grant on a first frequency band and a spatial domain transmission filter for all or partial dedicated PUCCH resources.

In one embodiment, the first transmission configuration state is used to determine a spatial domain transmission filter for a PUSCH based on dynamic-grant or configured-grant related to a beam pair on a first frequency band and a spatial domain transmission filter for a dedicated PUCCH resource related to the beam pair after the first time.

In one embodiment, the first frequency band is a Carrier.

In one embodiment, the first frequency band is a BWP.

In one embodiment, the first frequency band is a serving cell.

In one embodiment, the first signaling indicates the first frequency band.

In one embodiment, a value of a bit field comprised in the first signaling indicates the first frequency band.

In one embodiment, the first frequency band is a Carrier to which the first signaling belongs.

In one embodiment, the first frequency band is a BWP to which the first signaling belongs.

In one embodiment, the first frequency band is a serving cell to which the first signaling belongs.

In one embodiment, the first signaling is used to determine the first CORESET pool.

In one embodiment, the first CORESET pool is a CORESET pool to which the first signaling belongs.

In one embodiment, the first signaling is used to determine the beam pair.

In one embodiment, the first signaling indicates the beam pair.

In one embodiment, for any reference signal resource in the first resource configuration, among measurements on different occurrences of the any reference signal resource in time domain, only measurement(s) on occurrence(s) of the reference signal resource after the first time is(are) used to generate the first information block.

In one embodiment, measurements on only partial reference signal resources in the first resource configuration are used to generate the first information block.

In one embodiment, measurements on all reference signal resources in the first resource configuration are used to generate the first information block.

In one embodiment, channel measurements on reference signal resource(s) in the first resource configuration are used to generate the first information block.

In one embodiment, channel measurements on only partial reference signal resources in the first resource configuration are used to generate the first information block.

In one embodiment, channel measurements on all reference signal resource(s) in the first resource configuration are used to generate the first information block.

In one embodiment, the phrase that a measurement on a reference signal resource is used to generate the first information block includes a meaning that the first node will acquire based on the reference signal resource a channel measurement used for calculating a CSI value carried in the first information block.

In one embodiment, the phrase that a measurement on a reference signal resource is used to generate the first information block includes a meaning that the first node will acquire based on the reference signal resource an interference measurement used for calculating a CSI value carried in the first information block.

In one embodiment, the phrase that a measurement on a reference signal resource is used to generate the first information block includes a meaning that a measurement on the reference signal resource is used to determine a first channel matrix, the first channel matrix being used to calculate CSI carried in the first information block.

In one embodiment, the phrase that a measurement on a reference signal resource is used to generate the first information block includes a meaning that the first information block comprises a L1-RSRP or a L1-SINR of the reference signal resource.

In one embodiment, when and only when the first index is equal to one of the N first-type indexes will the first node transmit the first information block.

In one subembodiment, when the first index is unequal to any of the N first-type indexes, the first node will drop transmitting the first information block.

Embodiment 2

Figure 2:
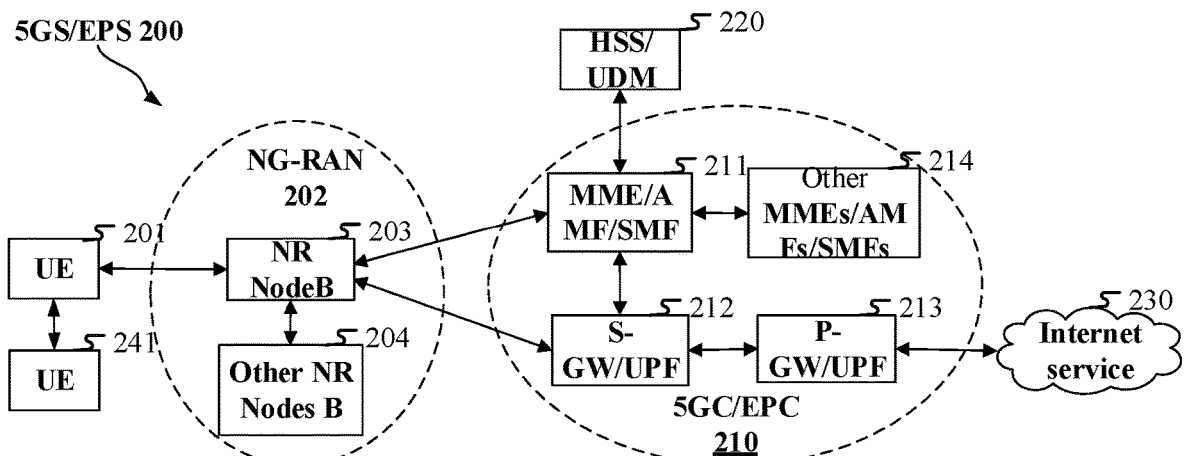
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The network architecture 200 LTE, LTE-A and future 5G systems may be called an Evolved Packet System (EPS) 200. The 5G NR or LTE network architecture 200 may be called a 5G System/Evolved Packet System (5GS/EPS) 200 or other suitable terminology. The 5GS/EPS 200 may comprise one or more UEs 201, a UE 241 in sidelink communication with UE(s) 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present disclosure includes the UE 201.

In one embodiment, the second node in the present disclosure includes the gNB 203.

In one embodiment, a radio link between the UE 201 and the gNB 203 is a cellular link.

In one embodiment, a transmitter for the first reporting configuration in the present disclosure includes the gNB 203.

In one embodiment, a receiver for the first reporting configuration in the present disclosure includes the UE 201.

In one embodiment, a transmitter for the first signaling in the present disclosure includes the gNB 203.

In one embodiment, a receiver for the first signaling in the present disclosure includes the UE 201.

In one embodiment, a transmitter for the first information block in the present disclosure includes the UE 201.

In one embodiment, a receiver for the first information block in the present disclosure includes the gNB 203.

Embodiment 3

Figure 3:
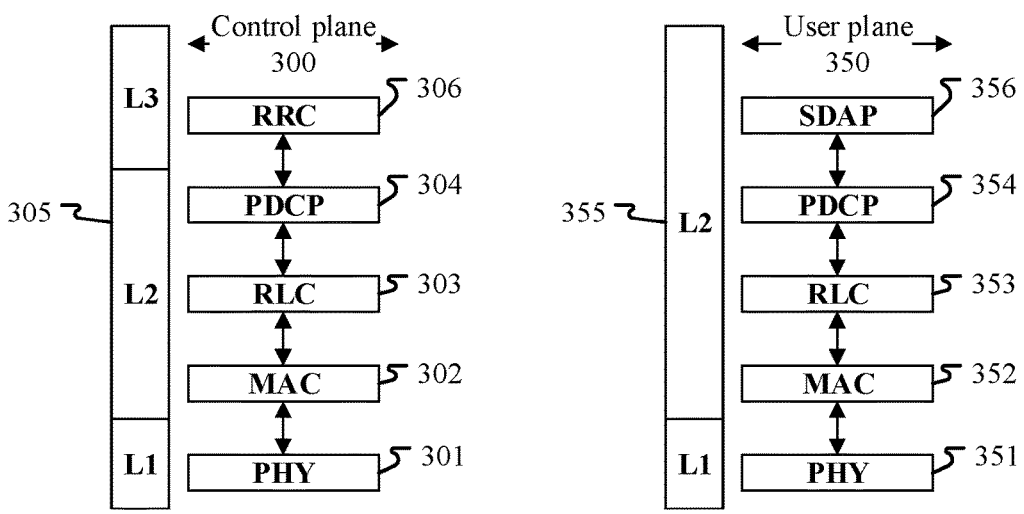
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first reporting configuration is generated by the RRC sublayer 306.

In one embodiment, the first reporting configuration is generated by the MAC sublayer 302, or the MAC sublayer 352.

In one embodiment, some part of the first reporting configuration is generated by the RRC sublayer 306; the other part of the first reporting configuration is generated by the MAC sublayer 302, or the MAC sublayer 352.

In one embodiment, the first signaling is generated by the PHY 301, or the PHY 351.

In one embodiment, the first signaling is generated by the MAC sublayer 302, or the MAC sublayer 352.

In one embodiment, the first information block is generated by the PHY 301, or the PHY 351.

In one embodiment, the second signaling is generated by the PHY 301, or the PHY 351.

In one embodiment, the second signaling is generated by the MAC sublayer 302, or the MAC sublayer 352.

In one embodiment, the first signal is generated by the PHY 301, or the PHY 351.

In one embodiment, the second signal is generated by the PHY 301, or the PHY 351.

In one embodiment, the second information block is generated by the RRC sublayer 306.

In one embodiment, the second information block is generated by the MAC sublayer 302, or the MAC sublayer 352.

In one embodiment, some part of the second information block is generated by the RRC sublayer 306; the other part of the second information block is generated by the MAC sublayer 302, or the MAC sublayer 352.

Embodiment 4

Figure 4:
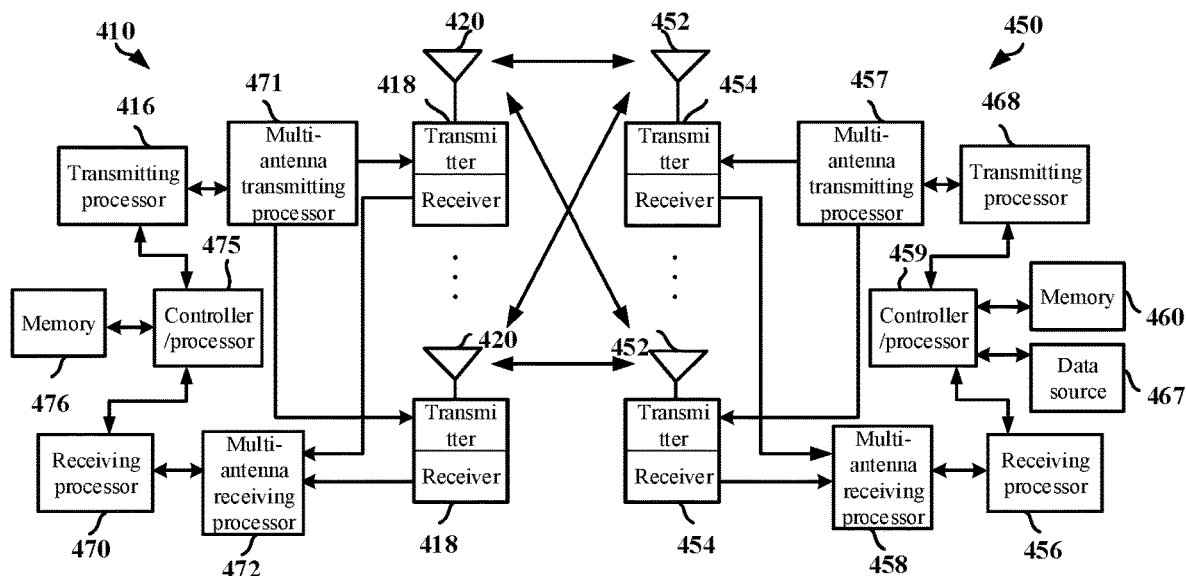
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication node 450 at least receives the first reporting configuration; receives the first signaling; and transmits the first information block.

In one embodiment, the second communication device 450 comprises a memory that stores computer readable instruction program, the computer readable instruction program generates an action when executed by at least one processor, which includes: receiving the first reporting configuration; receiving the first signaling; and transmitting the first information block.

In one embodiment, the first communication device 410 comprises at least one processor and at least one memory. The at least one memory comprises computer program codes; the at least one memory and the computer program codes are configured to be used in collaboration with the at least one processor. The first communication node 410 at least transmits the first reporting configuration; transmits the first signaling; and receives the first information block.

In one embodiment, the first communication device 410 comprises a memory that stores computer readable instruction program, the computer readable instruction program generates an action when executed by at least one processor, which includes: transmitting the first reporting configuration; transmitting the first signaling; and receiving the first information block.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first reporting configuration; at least one of the antenna 420, the transmitter 418, the transmitting processor 416, the multi-antenna transmitting processor 471, the controller/processor 475 or the memory 476 is used to transmit the first reporting configuration.

In one embodiment, at least one of the antenna 452, the receiver 454, the receiving processor 456, the multi-antenna receiving processor 458, the controller/processor 459, the memory 460 or the data source 467 is used to receive the first signaling; at least one of the antenna 420, the transmitter 418, the transmitting processor 416, the multi-antenna transmitting processor 471, the controller/processor 475 or the memory 476 is used to transmit the first signaling.

In one embodiment, at least one of the antenna 420, the receiver 418, the receiving processor 470, the multi-antenna receiving processor 472, the controller/processor 475, or the memory 467 is used to receive the first information block; at least one of the antenna 452, the transmitter 454, the transmitting processor 468, the multi-antenna transmitting processor 457, the controller/processor 459 or the memory 460 is used to transmit the first information block.

In one embodiment, at least one of the antenna 452, the receiver 454, the receiving processor 456, the multi-antenna receiving processor 458, the controller/processor 459, the memory 460 or the data source 467 is used to receive the second signaling; at least one of the antenna 420, the transmitter 418, the transmitting processor 416, the multi-antenna transmitting processor 471, the controller/processor 475 or the memory 476 is used to transmit the second signaling.

In one embodiment, at least one of the antenna 420, the receiver 418, the receiving processor 470, the multi-antenna receiving processor 472, the controller/processor 475, or the memory 467 is used to receive the first signal at least one of the antenna 452, the transmitter 454, the transmitting processor 468, the multi-antenna transmitting processor 457, the controller/processor 459 or the memory 460 is used to transmit the first signal.

In one embodiment, at least one of the antenna 452, the receiver 454, the receiving processor 456, the multi-antenna receiving processor 458, the controller/processor 459, the memory 460 or the data source 467 is used to receive the second signal; at least one of the antenna 420, the transmitter 418, the transmitting processor 416, the multi-antenna transmitting processor 471, the controller/processor 475 or the memory 476 is used to transmit the second signal.

In one embodiment, at least one of the antenna 452, the receiver 454, the receiving processor 456, the multi-antenna receiving processor 458, the controller/processor 459, the memory 460 or the data source 467 is used to receive the second information block; at least one of the antenna 420, the transmitter 418, the transmitting processor 416, the multi-antenna transmitting processor 471, the controller/processor 475 or the memory 476 is used to transmit the second information block.

Embodiment 5

Figure 5:
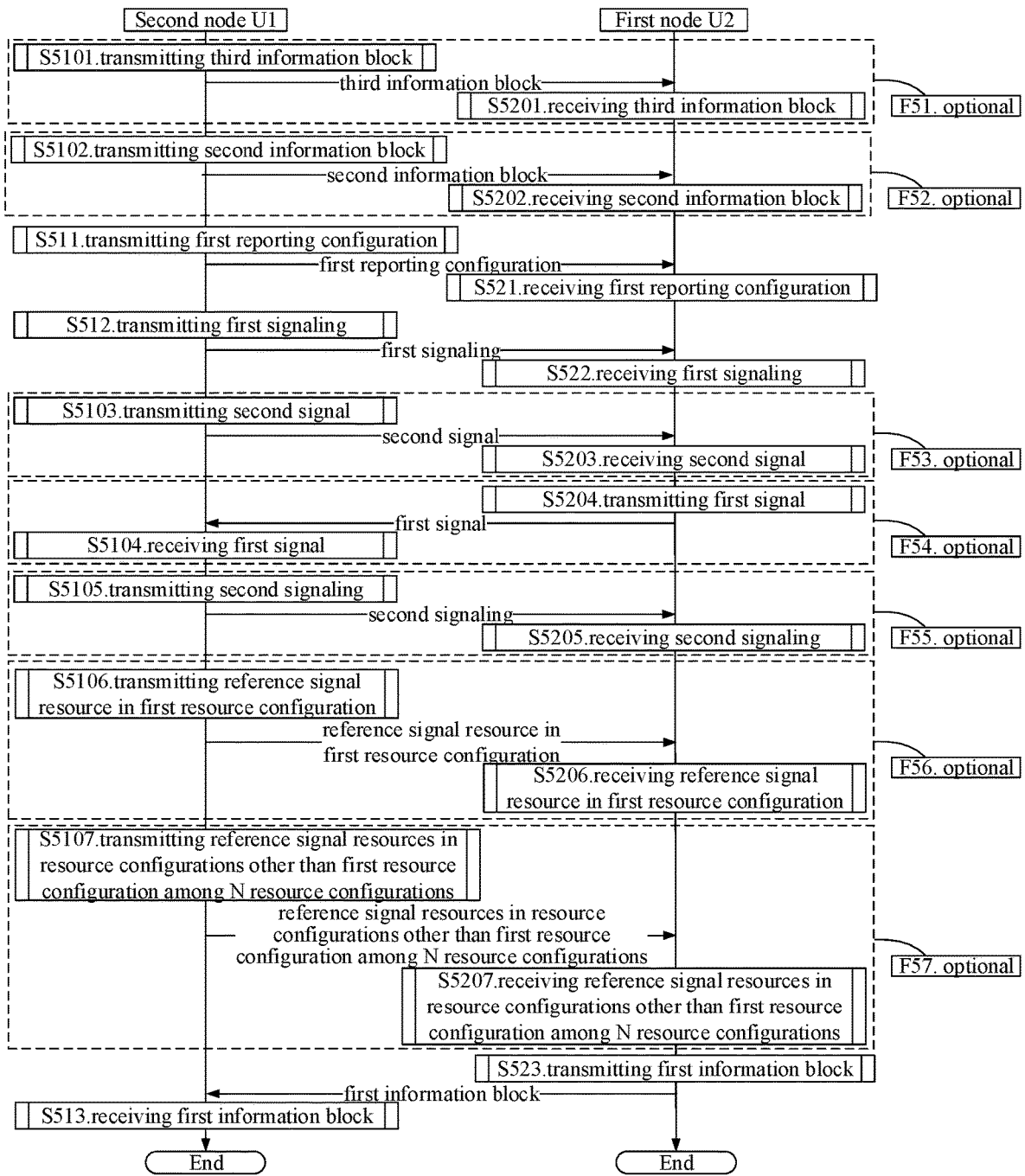
FIG. 5 illustrates a flowchart of transmission according to one embodiment of the present disclosure.

Embodiment 5 illustrates a flowchart of wireless transmission according to one embodiment of the present disclosure, as shown in FIG. 5. In FIG. 5, a second node U1 and a first node U2 are communication nodes in communications via an air interface. In FIG. 5, steps marked by boxes F51 to F57 are optional, respectively.

The second node U1 transmits a third information block in step S5101; transmits a second information block in step S5102; and transmits a first reporting configuration in step S511; transmits a first signaling in step S512; transmits a second signal in step S5103; receives a first signal in step S5104; and transmits a second signaling in step S5105; transmits reference signal resource(s) in a first resource configuration in step S5106; transmits reference signal resources in resource configurations other than the first resource configuration among the N resource configurations in step S5107; and receives a first information block in step S513.

The first node U2 receives a third information block in step S5201; receives a second information block in step S5202; and receives a first reporting configuration in step S521; receives a first signaling in step S522; receives a second signal in step S5203; transmits a first signal in step S5204; and receives a second signaling in step S5205; receives reference signal resource(s) in a first resource configuration in step S5206; receives reference signal resources in resource configurations other than the first resource configuration among the N resource configurations in step S5207; and transmits a first information block in step S523.

In Embodiment 5, the first signaling indicates a first transmission configuration state, the first signaling being used by the first node U2 to determine a first time; the first information block comprises a reporting for the first reporting configuration after the first time, the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used by the first node U2 to determine the first resource configuration from the N resource configurations;

a measurement on reference signal resource(s) only in the first resource configuration among the N resource configurations is used by the first node U2 to generate the first information block, or, the first transmission configuration state is used by the first node U2 to determine a spatial relation of reference signal resource(s) only in the first resource configuration among the N resource configurations, or, a measurement on reference signal resource(s) only in the first resource configuration among the N resource configurations is used by the first node U2 to generate the first information block, and the first transmission configuration state is used by the first node U2 to determine a spatial relation of reference signal resource(s) only in the first resource configuration among the N resource configurations.

In one embodiment, the first node U2 is the first node in the present disclosure.

In one embodiment, the second node U1 is the second node in the present disclosure.

In one embodiment, an air interface between the second node U1 and the first node U2 includes a radio interface between a base station and a UE.

In one embodiment, an air interface between the second node U1 and the first node U2 includes a radio interface between a UE and another UE.

In one embodiment, the second node U1 is a maintenance base station for a serving cell of the first node U2.

In one embodiment, the first signaling is used by the second node U1 to determine the first time.

In one embodiment, the first reporting configuration is transmitted in a downlink physical layer data channel (i.e., a downlink channel capable of bearing physical layer data).

In one embodiment, the first reporting configuration is transmitted on a PDSCH.

In one embodiment, the first signaling is transmitted in a downlink physical layer control channel (i.e., a downlink channel only capable of bearing physical layer signaling).

In one embodiment, the first signaling is transmitted in a PDCCH.

In one embodiment, the first information block is transmitted in a PUCCH.

In one embodiment, the first information block is transmitted in a PUSCH.

In one embodiment, steps marked by the box F52 in FIG. 5 exist; the second information block is used by the first node U2 to determine P transmission configuration states, where P is a positive integer greater than 1, the first signaling indicates the first transmission configuration state from the P transmission configuration states.

In one embodiment, the second information block is transmitted in a PDSCH.

In one embodiment, steps marked by the box F53 in FIG. 5 exist; the first signaling comprises scheduling information for the second signal.

In one embodiment, the second signal is transmitted in a PDSCH.

In one embodiment, the steps marked by the box F53 in FIG. 5 do not exist.

In one embodiment, steps marked by the box F54 in FIG. 5 exist; the first signal carries a HARQ-ACK associated with the first signaling.

In one embodiment, the first signal is transmitted in a PUCCH.

In one embodiment, the first signal is transmitted in a PUSCH.

In one embodiment, the steps marked by the box F53 and the box F54 in FIG. 5 exist.

In one embodiment, the steps marked by the box F53 in FIG. 5 do not exist, while steps marked by the box F54 in FIG. 5 exist.

In one embodiment, the steps marked by the box F53 in FIG. 5 exist, while steps marked by the box F54 in FIG. 5 do not exist.

In one embodiment, the steps marked by the box F55 in FIG. 5 exist, the second signaling is used to trigger the first information block; the second signaling indicates a first triggering state, the first triggering state being used to trigger a reporting for the first reporting configuration.

In one embodiment, the second signaling is used by the second node U1 to trigger the first information block.

In one embodiment, the second signaling is used by the second node U1 to trigger a reporting for the first reporting configuration.

In one embodiment, the second signaling is transmitted in a PDCCH.

In one embodiment, the steps marked by the box F51 in FIG. 5 exist; the above method in a first node for wireless communications comprises:

receiving a third information block; herein, the third information block comprises the first triggering state.

In one embodiment, the third information block is carried by a higher layer signaling.

In one embodiment, the third information block is carried by an RRC signaling.

In one embodiment, the third information block comprises information in all or partial fields in an IE.

In one embodiment, the third information block is carried by a CSI-AperiodicTriggerStateList IE.

In one embodiment, the first node receives the third information block before receiving the first reporting configuration.

In one embodiment, the first node receives the third information block after receiving the first reporting configuration.

In one embodiment, the third information block is transmitted in a PDSCH.

In one embodiment, the steps marked by the box F56 in FIG. 5 exist; the above method in a first node for wireless communications comprises:

receiving reference signal resource(s) in the first resource configuration.

In one embodiment, the steps marked by the box F57 in FIG. 5 exist; the above method in a first node for wireless communications comprises:

receiving reference signal resource(s) in resource configurations other than the first resource configuration among the N resource configurations.

In one embodiment, the phrase of receiving a reference signal resource comprises a meaning of receiving a reference signal transmitted in the reference signal resource.

In one embodiment, the phrase of receiving a reference signal resource comprises a meaning of receiving a reference signal corresponding to the reference signal resource.

In one embodiment, the phrase of receiving a reference signal resource comprises a meaning of receiving a reference signal transmitted according to configuration information for the reference signal resource.

Embodiment 6

Embodiment 6 illustrates a schematic diagram of a first signaling used to determine a first time according to one embodiment of the present disclosure, as shown in FIG. 6.

In one embodiment, the first time is an application time for the first transmission configuration state.

In one embodiment, the first transmission configuration state is applicable from the first time.

In one embodiment, a QCL relation indicated by the first transmission configuration state is applicable from the first time.

In one embodiment, time-domain resources occupied by the first signaling are used to determine the first time.

In one embodiment, the first time is later than the first signaling.

In one embodiment, the first time is later than a first reference time, time-domain resources occupied by the first signaling are used to determine the first reference time.

In one subembodiment, the first reference time is either an end time or a start time for time-domain resources occupied by the first signaling.

In one subembodiment, the first reference time is either an end time or a start time for a time unit occupied by the first signaling.

In one embodiment, a time interval between the first time and the first reference time is no smaller than a first interval.

In one embodiment, a time interval between the first time and the first reference time is equal to a first interval.

In one embodiment, the first time is a start time for a first time unit following a first interval after the first reference time.

In one embodiment, the first interval is configured by RRC.

In one embodiment, the first interval is fixed.

In one embodiment, the first interval is a non-negative real number.

In one embodiment, the first interval is a positive integer.

In one embodiment, the first interval is measured in slot(s).

In one embodiment, the first interval is measured in milliseconds (ms).

In one embodiment, the first interval is measured in wideband symbol(s).

In one embodiment, the time unit is a slot.

In one embodiment, the time unit is a sub-slot.

In one embodiment, the time unit is a wideband symbol.

In one embodiment, the time unit comprises more than one consecutive wideband symbols.

In one embodiment, the wideband symbol is an Orthogonal Frequency Division Multiplexing (OFDM) Symbol.

In one embodiment, the wideband symbol is a Single Carrier-Frequency Division Multiple Access (SC-FDMA) symbol.

In one embodiment, the wideband symbol is a Discrete Fourier Transform Spread OFDM (DFT-S-OFDM) symbol.

In one embodiment, time-domain resources occupied by the first signal are used to determine the first time.

In one embodiment, the phrase that the first signaling is used to determine a first time comprises: time-domain resources of the first signal are used to determine the first time, the first signaling being used to determine the time-domain resources of the first signal.

In one embodiment, the first time is later than a second reference time, time-domain resources occupied by the first signal are used to determine the second reference time, the first signaling being used to determine the time-domain resources occupied by the first signal.

In one subembodiment, the second reference time is either an end time or a start time for time-domain resources occupied by the first signal.

In one subembodiment, the second reference time is either an end time or a start time for a time unit occupied by the first signal.

In one embodiment, a time interval between the first time and the second reference time is no smaller than a second interval.

In one embodiment, a time interval between the first time and the second reference time is equal to a second interval.

In one embodiment, the first time is a start time for a first time unit following a second interval after the second reference time.

In one embodiment, the second interval is configured by RRC.

In one embodiment, the second interval is fixed.

In one embodiment, the second interval is a non-negative real number.

In one embodiment, the second interval is a positive integer.

In one embodiment, the second interval is measured in slot(s).

In one embodiment, the second interval is measured in milliseconds (ms).

In one embodiment, the second interval is measured in wideband symbol(s).

In one embodiment, the first time is a start time for a first time unit, the first time unit being a first time unit, between which and the first reference time a time interval is no smaller than the first interval, and, between which and the second reference time a time interval is no smaller than the second interval.

Embodiment 7

Embodiment 7 illustrates a schematic diagram of a first transmission configuration state used to determine a spatial relation of reference signal resource(s) in a first resource configuration according to one embodiment of the present disclosure; as shown in FIG. 7.

In one embodiment, the first transmission configuration state is used to determine a spatial relation of at least one reference signal resource in the first resource configuration.

In one embodiment, the first transmission configuration state is used to determine a spatial relation of each reference signal resource in the first resource configuration.

In one embodiment, the first transmission configuration state is used to determine a spatial relation of only partial reference signal resources in the first resource configuration.

In one embodiment, the first transmission configuration state is used to determine a spatial relation of reference signal resource(s) only in the first reference signal resource group in the first resource configuration.

In one embodiment, the first transmission configuration state is used to determine a spatial relation of each reference signal resource in the first reference signal resource group.

In one embodiment, the first transmission configuration state is used to determine a spatial relation of reference signal resource(s) only in the first reference signal resource set in the first resource configuration.

In one embodiment, the first transmission configuration state is used to determine a spatial relation of each reference signal resource in the first reference signal resource set.

In one embodiment, the first transmission configuration state is used to determine a spatial relation of reference signal resource(s) only in the first reference signal resource group in the first reference signal resource set.

In one embodiment, the spatial relation comprises a TCI state.

In one embodiment, the spatial relation comprises a QCL parameter.

In one embodiment, the spatial relation comprises a QCL relation.

In one embodiment, the spatial relation comprises a QCL assumption.

In one embodiment, the spatial relation comprises a spatial domain filter.

In one embodiment, the spatial relation comprises a spatial domain transmission filter.

In one embodiment, the spatial relation comprises a spatial domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the large-scale properties include one or more of delay spread, Doppler spread, Doppler shift, average delay or Spatial Rx parameter.

In one embodiment, the phrase that the first transmission configuration state is used to determine a spatial relation of a reference signal resource includes a meaning that the first transmission configuration state indicates a QCL relation between the reference signal resource and one or more reference signal resources.

In one embodiment, the phrase that the first transmission configuration state is used to determine a spatial relation of a reference signal resource includes a meaning that the first transmission configuration state is a TCI state, where the TCI state of the reference signal resource is the first transmission configuration state.

In one embodiment, the phrase that the first transmission configuration state is used to determine a spatial relation of a reference signal resource includes a meaning that the first transmission configuration state is used to determine a spatial domain reception filter for the reference signal resource.

In one embodiment, the first transmission configuration state indicates the first target reference signal resource, the phrase that the first transmission configuration state is used to determine a spatial relation of a reference signal resource includes a meaning that the first node receives the first target reference signal resource and the reference signal resource using a same spatial domain filter.

In one embodiment, the first transmission configuration state indicates the first target reference signal resource, the phrase that the first transmission configuration state is used to determine a spatial relation of a reference signal resource includes a meaning that the first node transmits the first target reference signal resource and receives the reference signal resource using a same spatial domain filter.

In one embodiment, the phrase that the first transmission configuration state is used to determine a spatial relation of a reference signal resource includes a meaning that the first transmission configuration state is used to determine spatial Rx parameters for the reference signal resource.

In one embodiment, the first transmission configuration state indicates the first target reference signal resource, the phrase that the first transmission configuration state is used to determine a spatial relation of a reference signal resource includes a meaning that the first node receives the first target reference signal resource and the reference signal resource using the same spatial Rx parameters.

In one embodiment, the first transmission configuration state indicates the first target reference signal resource, the phrase that the first transmission configuration state is used to determine a spatial relation of a reference signal resource includes a meaning that the reference signal resource and the first target reference signal resource are quasi co-located.

In one embodiment, the first transmission configuration state indicates the first target reference signal resource, the phrase that the first transmission configuration state is used to determine a spatial relation of a reference signal resource includes a meaning that the reference signal resource and the first target reference signal resource are quasi co-located with QCL-TypeD.

In one embodiment, the first transmission configuration state indicates the first target reference signal resource, the phrase that the first transmission configuration state is used to determine a spatial relation of a reference signal resource includes a meaning that large-scale properties of a channel on which the reference signal resource is delivered can be inferred from large-scale properties of a channel on which the first target reference signal resource is delivered.

In one embodiment, a channel through which a reference signal resource is delivered refers to a channel through which a reference signal transmitted according to configuration information for the reference signal resource is delivered.

In one embodiment, a channel through which a reference signal resource is delivered refers to a channel through which a reference signal transmitted in the reference signal resource is delivered.

In one embodiment, the reference signal resource is a reference signal resources in the first resource configuration.

In one embodiment, the reference signal resource is any reference signal resources in the first resource configuration.

In one embodiment, the reference signal resource is any reference signal resources in the first reference signal resource set.

In one embodiment, the reference signal resource is any reference signal resources in the first reference signal resource group.

Embodiment 8

Embodiment 8 illustrates a schematic diagram of a second reference signal resource according to one embodiment of the present disclosure, as shown in FIG. 8. In Embodiment 8, when a first condition is fulfilled, a second reference signal resource is triggered, and a measurement on the second reference signal resource is used for generating the first information block; the first condition comprises: the first resource configuration is periodic or semi-persistent, and a third reference signal resource in the first resource configuration does not occur after the first time and before a CSI reference resource corresponding to the first information block; the second reference signal resource and the third reference signal resource are quasi co-located and occupy same Resource Elements (REs) in a time-frequency resource block.

In one embodiment, the second reference signal resource comprises a CSI-RS resource.

In one embodiment, the second reference signal resource is aperiodic.

In one embodiment, the time-frequency resource block occupies a slot in time domain and 12 consecutive subcarriers in frequency domain.

In one embodiment, the time-frequency resource block is a Physical Resource Block (PRB).

In one embodiment, the second reference signal resource and the third reference signal resource correspond to a same CDM type.

In one embodiment, the second reference signal resource and the third reference signal resource are quasi co-located with QCL-TypeD.

Embodiment 9

Embodiment 9 illustrates a schematic diagram of a second-type index group, a second index and a first reference signal resource group according to one embodiment of the present disclosure; as shown in FIG. 9. In Embodiment 9, any reference signal resource in the N resource configurations corresponds to a said second-type index group; the first transmission configuration state corresponds to the second index, the second index being a said second-type index; the second index is used by the first node to determine the first reference signal resource group from the first resource configuration; a measurement on reference signal resource(s) in only the first reference signal resource group in the first resource configuration is used by the first node for generating the first information block, or, the first transmission configuration state is used by the first node to determine a spatial relation of reference signal resource(s) in only the first reference signal resource group in the first resource configuration, or, a measurement on reference signal resource(s) in only the first reference signal resource group in the first resource configuration is used by the first node for generating the first information block and the first transmission configuration state is used by the first node to determine a spatial relation of reference signal resource(s) in only the first reference signal resource group in the first resource configuration.

In one embodiment, the second index is used to determine which reference signal resource(s) in the first resource configuration belongs/belong to the first reference signal resource group.

In one embodiment, a measurement on reference signal resource(s) only in the first reference signal resource group in the first resource configuration is used to generate the first information block.

In one embodiment, a measurement on at least one reference signal resource not belonging to the first reference signal resource group in the first resource configuration is used to generate the first information block.

In one embodiment, the first transmission configuration state is used to determine a spatial relation of reference signal resource(s) only in the first reference signal resource group in the first resource configuration.

In one embodiment, the first transmission configuration state is used to determine a spatial relation of reference signal resource(s) only in the first reference signal resource group in the first resource configuration after the first time.

In one embodiment, the first transmission configuration state is used to determine a spatial relation of at least one reference signal resource not belonging to the first reference signal resource group in the first resource configuration.

In one embodiment, the first transmission configuration state is used to determine a spatial relation of at least one reference signal resource not belonging to the first reference signal resource group in the first resource configuration after the first time.

In one embodiment, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration.

In one embodiment, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration after the first time.

In one embodiment, a measurement on each reference signal resource in the first reference signal resource group is used to generate the first information block.

In one embodiment, a channel measurement on each reference signal resource in the first reference signal resource group is used to generate the first information block.

In one embodiment, the first transmission configuration state is used to determine a spatial relation of each reference signal resource in the first reference signal resource group.

In one embodiment, in response to the action of receiving the first signaling, the first node determines the first reference signal resource group from the first resource configuration.

In one embodiment, the first information block is unrelated to a measurement on any reference signal resource other than the first reference signal resource group in the first resource configuration.

In one embodiment, a spatial relation of any reference signal resource not belonging to the first reference signal resource group in the first resource configuration is unrelated to the first transmission configuration.

In one embodiment, after the first time any reference signal resource not belonging to the first reference signal resource group in the first resource configuration continues using a spatial relation before the first time.

In one embodiment, a spatial relation of reference signal resource(s) in the first reference signal resource group is different before and after the first time.

In one embodiment, before the first time, a second transmission configuration state is used to determine a spatial relation of reference signal resource(s) in the first reference signal resource group, after the first time, the first transmission configuration state replaces the second transmission configuration state to be used to determine a spatial relation of reference signal resource(s) in the first reference signal resource group.

In one embodiment, the second-type index is a non-negative integer.

In one embodiment, the second-type index comprises a TCI-StateId.

In one embodiment, the second-type index is a TCI-StateId.

In one embodiment, a said second-type index is used for identifying a transmission configuration state.

In one embodiment, a said second-type index is used for identifying a TCI state.

In one embodiment, a said second-type index is used for identifying a QCL relation.

In one embodiment, a said second-type index is used for identifying a Transmitter Receiver Point (TRP).

In one embodiment, a said second-type index is used for identifying a panel.

In one embodiment, the transmission configuration state identified by a said second-type index indicates one or two reference signal resources.

In one embodiment, the transmission configuration state identified by a said second-type index comprises parameters used for configuring QCL relations between one or two reference signal resources and a DMRS port for a physical layer data channel, a DMRS port for a physical layer control channel, or a reference signal port for reference signal resources.

In one embodiment, any of the N resource configurations comprises the second-type index group corresponding to all reference signal resources in the resource configuration.

In one embodiment, configuration information for any reference signal resource in the N resource configurations comprises the second-type index group corresponding to the reference signal resource.

In one embodiment, the second-type index group corresponding to any reference signal resource in the N resource configurations indicates a TCI state group; each second-type index in the corresponding second-type index group indicates a TCI state in the TCI state group.

In one embodiment, second-type indexes in the second-type index group corresponding to any reference signal resource in the N resource configurations are mutually unequal.

In one embodiment, the second-type index group corresponding to any reference signal resource in the N resource configurations comprises more than one said second-type index.

In one embodiment, there is a reference signal resource in the N resource configurations corresponding to the second-type index group that only comprises one said second-type index.

In one embodiment, there is a reference signal resource in the N resource configurations corresponding to the second-type index group that comprises more than one said second-type index.

In one embodiment, the second index is a non-negative integer.

In one embodiment, the second index is a transmission configuration state identifier for the first transmission configuration state.

In one embodiment, the second index is a TCI-StateId for the first transmission configuration state.

In one embodiment, the second index is used for identifying the first transmission configuration state.

In one embodiment, the first reference signal resource group comprises at least one reference signal resource in the first resource configuration.

In one embodiment, the first reference signal resource group comprises multiple reference signal resources in the first resource configuration.

In one embodiment, the first reference signal resource group comprises only one reference signal resource in the first resource configuration.

In one embodiment, the first reference signal resource group comprises all reference signal resources in the first resource configuration.

In one embodiment, there is at least one reference signal resource in the first resource configuration that does not belong to the first reference signal resource group.

In one embodiment, there is a second-type index being equal to the second index in a second-type index group corresponding to any reference signal resource in the first reference signal resource group.

In one embodiment, any second-type index in a second-type index group that corresponds to any reference signal resource not belonging to the first reference signal resource group in the first resource configuration is unequal to the second index.

In one embodiment, there is a second-type index in a second-type index group corresponding to any reference signal resource in the first reference signal resource group by which the transmission configuration state identified indicates a reference signal being quasi co-located with a reference signal indicated by the first transmission configuration state, with QCL-TypeD.

In one embodiment, any reference signal indicated by the transmission configuration state identified by any second-type index in a second-type index group corresponding to any reference signal not belonging to the first reference signal resource group in the first resource configuration is non-quasi co-located with any reference signal indicated by the first transmission configuration state, with QCL-TypeD.

In one embodiment, there is a second-type index being equal to the second index in a second-type index group corresponding to at least one reference signal resource in the first resource configuration.

In one embodiment, there is a second-type index in a second-type index group corresponding to at least one reference signal resource in the first resource configuration by which the transmission configuration state identified indicates a reference signal being quasi co-located with a reference signal indicated by the first transmission configuration state, with QCL-TypeD.

In one embodiment, when and only when there is a second-type index being equal to the second index in a second-type index group corresponding to at least one reference signal resource in the first resource configuration will the first node transmit the first information block.

In one embodiment, when and only when there is a second-type index in a second-type index group corresponding to at least one reference signal resource in the first resource configuration by which the transmission configuration state identified indicates a reference signal being quasi co-located with a reference signal indicated by the first transmission configuration state, with QCL-TypeD will the first node transmit the first information block.

In one embodiment, a CSI reference source corresponding to the first information block is later than an occurrence of a reference signal resource in the first reference signal resource group after the first time.

In one embodiment, a CSI reference source corresponding to the first information block is later than an occurrence of any reference signal resource in the first reference signal resource group after the first time.

Embodiment 10

Embodiment 10 illustrates a schematic diagram of a second signaling being used to trigger a first information block according to one embodiment of the present disclosure, as shown in FIG. 10. In Embodiment 10, the second signaling indicates the first triggering state, the first triggering state being used to trigger a reporting for the first reporting configuration.

In one embodiment, the first information block comprises the reporting for the first reporting configuration triggered by the first triggering state.

In one embodiment, the second signaling is later than the first time in time domain.

In one embodiment, time-domain resources occupied by the second signaling are within a duration in which the first transmission configuration state is applicable.

In one embodiment, the second signaling comprises a physical-layer signaling.

In one embodiment, the second signaling is a physical layer signaling.

In one embodiment, the second signaling comprises a layer 1 (L1) signaling.

In one embodiment, the second signaling comprises DCI.

In one embodiment, the second signaling is DCI.

In one embodiment, the second signaling comprises one or more fields in a DCI.

In one embodiment, the second signaling comprises DCI for UpLink Grant.

In one embodiment, a DCI format for the second signaling is DCI format 0_1 or DCI format 0_2.

In one embodiment, CRC of the second signaling is scrambled by a C-RNTI.

In one embodiment, the second signaling is earlier than the first signaling in time domain.

In one embodiment, the second signaling is later than the first signaling in time domain.

In one embodiment, the first triggering state is a CSI aperiodic trigger state.

In one embodiment, the first triggering state is configured by a higher layer signaling.

In one embodiment, the first triggering state is configured by an RRC signaling.

In one embodiment, the first triggering state comprises all or partial information in an IE.

In one embodiment, the first triggering state comprises all or partial information in a first IE, where names of the first IE include "CSI-AperiodicTriggerStateList".

In one subembodiment, the first IE indicates at least one triggering state, the first triggering state being one of the at least one triggering state.

In one embodiment, the first triggering state comprises CSI-AssociatedReportConfigInfo.

In one embodiment, the first triggering state indicates an identifier of the first reporting configuration.

In one subembodiment, the identifier of the first reporting configuration is a CSI-ReportConfigId.

In one embodiment, the first triggering state belongs to a first triggering state set, the first triggering state set comprising at least one triggering state; the second signaling indicates the first triggering state in the first triggering state set.

In one subembodiment, the second signaling indicates an index of the first triggering state in the first triggering state set.

In one subembodiment, the second signaling comprises a second field, and the second field in the second signaling indicates the first triggering state in the first triggering state set; the second field comprises at least one bit.

In one reference embodiment of the above subembodiment, the second field is a CSI request field in DCI.

In one reference embodiment of the above subembodiment, a value of the second field in the second signaling is equal to x, the first triggering state being an x-th triggering state in the first triggering state set; x is a positive integer.

In one reference embodiment of the above subembodiment, a value of the second field in the second signaling is equal to a codepoint onto which the first triggering state is mapped.

In one subembodiment, the first triggering state set is configured by an RRC signaling.

In one subembodiment, the first triggering state set is jointly configured by RRC and a MAC CE.

In one embodiment, the first reporting configuration is aperiodic.

In one embodiment, a reporting for the first reporting configuration can only be triggered by the first triggering state.

In one embodiment, a reporting for the first reporting configuration can be triggered by at least one triggering state other than the first triggering state.

In one embodiment, a codepoint onto which the first triggering state is mapped is a positive integer.

Embodiment 11

Embodiment 11 illustrates a schematic diagram of a first triggering state, M reference signal resource sets and a first reference signal resource set according to one embodiment of the present disclosure; as shown in FIG. 11. In Embodiment 11, the first resource configuration comprises the M reference signal resource sets; any of the M reference signal resource sets comprises at least one reference signal resource in the first resource configuration; a measurement on reference signal resource(s) only in the first reference signal resource set among the M reference signal resource sets is used by the first node to generate the first information block; the first triggering state indicates the first reference signal resource set from the M reference signal resource sets. In FIG. 11, indexes of the M reference signal resource sets are respectively #0 . . . , and #(M−1).

In one embodiment, the first triggering state indicates a TCI state corresponding to each reference signal resource in the first reference signal resource set.

In one embodiment, the first triggering state indicates the second-type index group corresponding to each reference signal resource in the first reference signal resource set.

In one embodiment, the first triggering state only indicates one reference signal resource set from the M reference signal resource sets.

In one embodiment, the first triggering state indicates an index of the first reference signal resource set in the M reference signal resource sets.

In one embodiment, any reference signal resource set of the M reference signal resource sets comprises a CSI-RS resource.

In one embodiment, any reference signal resource set of the M reference signal resource sets comprises a CSI-RS resource set.

In one embodiment, any reference signal resource set of the M reference signal resource sets comprises an NZP CSI-RS resource set.

In one embodiment, any reference signal resource set of the M reference signal resource sets is a CSI-RS resource set.

In one embodiment, any reference signal resource set of the M reference signal resource sets is an NZP CSI-RS resource set.

In one embodiment, any reference signal resource set of the M reference signal resource sets is identified by a third-type identifier; the third-type identifier is a non-negative integer.

In one embodiment, the third-type identifier is an NZP-CSI-RS-ResourceSetId.

In one embodiment, the third-type identifier is no greater than 63.

In one embodiment, any two reference signal resource sets among the M reference signal resource sets correspond to the third-type identifiers that are unequal.

In one embodiment, any two reference signal resources belonging to a same reference signal resource set among the M reference signal resource sets correspond to a same density and a same number of ports.

In one embodiment, any two reference signal resources belonging to a same reference signal resource set among the M reference signal resource sets correspond to a same starting Resource block (RB), a same number of RBs and a same Code Division Multiplexing type (cdm-type).

In one embodiment, there are two reference signal resource sets among the M reference signal resource sets, and a first given reference signal resource and a second given reference signal resource are respectively an arbitrary reference signal resource in the two reference signal resource sets.

In one subembodiment, the first given reference signal resource and the second given reference signal resource are different in at least one of corresponding densities or numbers of ports.

In one subembodiment, the first given reference signal resource and the second given reference signal resource are different in at least one of corresponding starting RBs, numbers of RBs or CDM types.

In one embodiment, the M reference signal resource sets correspond to a same time-domain behavior.

In one embodiment, any reference signal resource comprised in the first resource configuration belongs to a reference signal resource set among the M reference signal resource sets.

In one embodiment, any reference signal resource comprised in the first resource configuration belongs to one and only reference signal resource set among the M reference signal resource sets.

In one embodiment, there is a reference signal resource comprised in the first resource configuration belonging to multiple reference signal resource sets among the M reference signal resource sets.

In one embodiment, any reference signal resource in the first reference signal resource group belongs to the first reference signal resource set.

In one embodiment, the first reference signal resource group comprises at least one reference signal resource in the first reference signal resource set.

In one embodiment, the first reference signal resource group comprises all reference signal resources in the first reference signal resource set.

In one embodiment, there is one reference signal resource in the first reference signal resource set that does not belong to the first reference signal resource group.

In one embodiment, in response to the action of receiving the first signaling, the first node determines the first reference signal resource group from the first reference signal resource set.

In one embodiment, the first transmission configuration state is used to determine a spatial relation of reference signal resource(s) only in the first reference signal resource group in the first reference signal resource set.

In one embodiment, the first transmission configuration state is used to determine a spatial relation of reference signal resource(s) only in the first reference signal resource group in the first reference signal resource set after the first time.

In one embodiment, a CSI reference source corresponding to the first information block is later than an occurrence of a reference signal resource in the first reference signal resource set after the first time.

In one embodiment, a CSI reference source corresponding to the first information block is later than an occurrence of any reference signal resource in the first reference signal resource set after the first time.

Embodiment 12

Figure 12:
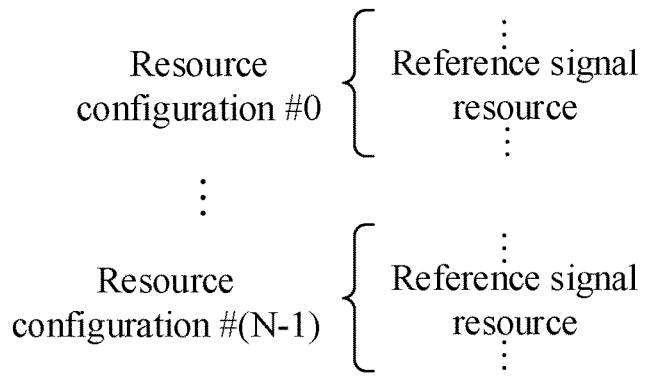
FIG. 12 illustrates a schematic diagram of N resource configurations according to one embodiment of the present disclosure.

Embodiment 12 illustrates a schematic diagram of N resource configurations according to one embodiment of the present disclosure; as shown in FIG. 12. In Embodiment 12, any of the N resource configurations comprises at least one reference signal resource. In FIG. 12, indexes for the N resource configurations are #0 . . . , and #(N−1), respectively.

In one embodiment, any two reference signal resources belonging to a same resource configuration among the N resource configurations correspond to a same density and a same number of ports.

In one embodiment, any two reference signal resources belonging to a same resource configuration among the N resource configurations correspond to a same starting RB, a same number of RBs and a same cdm-type.

In one embodiment, there are two reference signal resources belonging to different resource configurations among the N resource configurations that correspond to different densities and/or different numbers of ports.

In one embodiment, there are two reference signal resources belonging to different resource configurations among the N resource configurations that correspond to at least one of different starting RBs, different numbers of RBs or different CDM types.

Embodiment 13

Figure 13:
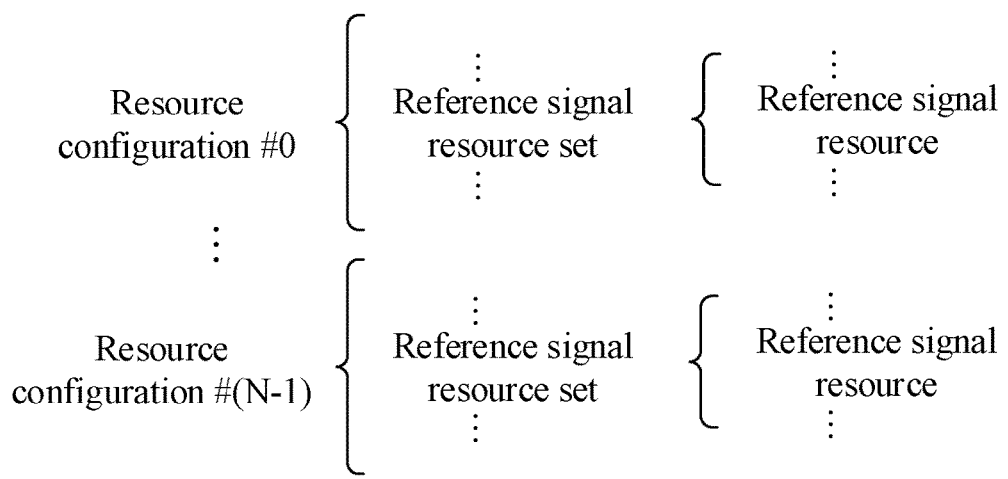
FIG. 13 illustrates a schematic diagram of N resource configurations according to one embodiment of the present disclosure.

Embodiment 13 illustrates a schematic diagram of N resource configurations according to one embodiment of the present disclosure; as shown in FIG. 13. In Embodiment 13, any of the N resource configurations comprises at least one reference signal resource set, any of the at least one reference signal resource set comprises at least one reference signal resource in the any resource configuration; any reference signal resource in the any resource configuration belongs to one of the at least one reference signal resource set; any reference signal resource set in the N resource configurations is identified by a said third-type identifier. In FIG. 13, indexes for the N resource configurations are #0 . . . , and #(N−1), respectively.

In one embodiment, any reference signal resource set in the N resource configurations comprises a CSI-RS resource.

In one embodiment, any reference signal resource set in the N resource configurations comprises a CSI-RS resource set.

In one embodiment, any reference signal resource set in the N resource configurations comprises an NZP CSI-RS resource set.

In one embodiment, any reference signal resource set in the N resource configurations is a CSI-RS resource set.

In one embodiment, any reference signal resource set in the N resource configurations is an NZP CSI-RS resource set.

In one embodiment, any two reference signal resource sets in the N resource configurations correspond to unequal third-type identifiers.

In one embodiment, there are two reference signal resource sets in the N resource configurations corresponding to equal third-type identifiers.

In one embodiment, there are two reference signal resource sets in the N resource configurations corresponding to unequal third-type identifiers.

In one embodiment, any two reference signal resource sets belonging to a same resource configuration among the N resource configurations correspond to unequal third-type identifiers.

In one embodiment, there are two reference signal resource sets belonging to different resource configurations among the N resource configurations corresponding to equal third-type identifiers.

In one embodiment, any two reference signal resources belonging to a same reference signal resource set in the N resource configurations correspond to unequal second-type identifiers.

In one embodiment, there are two reference signal resources belonging to different reference signal resource sets in the N resource configurations corresponding to equal second-type identifiers.

In one embodiment, among the N resource configurations there is a resource configuration only comprising a reference signal resource set.

In one embodiment, any of the N resource configurations only comprises a reference signal resource set.

In one embodiment, among the N resource configurations there is a resource configuration comprising multiple reference signal resource sets.

In one embodiment, any of the N resource configurations comprises multiple reference signal resource sets.

In one embodiment, the first reporting configuration is periodic or semi-persistent, any of the N resource configurations only comprises a reference signal resource set.

In one embodiment, the first reporting configuration is aperiodic, among the N resource configurations there is a resource configuration comprising multiple reference signal resource sets.

In one embodiment, among the N resource configurations there is a reference signal resource set only comprising a reference signal resource.

In one embodiment, among the N resource configurations there is a reference signal resource set comprising multiple reference signal resources.

In one embodiment, any reference signal resource set in the N resource configurations comprises multiple reference signal resources.

In one embodiment, any two reference signal resources belonging to a same reference signal resource set in the N resource configurations correspond to a same density and a same number of ports.

In one embodiment, any two reference signal resources belonging to a same reference signal resource set in the N resource configurations correspond to a same starting RB, a same number of RBs and a same cdm-type.

In one embodiment, there are two resource configurations among the N resource configurations, a first given reference signal resource set and a second given reference signal resource set are respectively reference signal resource sets in the two resource configurations, and a first given reference signal resource and a second given reference signal resource are respectively an arbitrary reference signal resource in the two given reference signal resource sets.

In one subembodiment, the first given reference signal resource and the second given reference signal resource are different in at least one of corresponding densities or numbers of ports.

In one subembodiment, the first given reference signal resource and the second given reference signal resource are different in at least one of corresponding starting RBs, numbers of RBs or CDM types.

In one embodiment, any two reference signal resource sets in any resource configuration of the N resource configurations correspond to a same time-domain behavior.

In one embodiment, any of the N resource configurations comprises configuration information for each reference signal resource set in the any resource configuration.

In one embodiment, configuration information for a reference signal resource set comprises at least a first one of reference signal resource(s) in the reference signal resource set, a value of a higher layer parameter "repetition" or a value of a higher layer parameter "trs-Info".

In one embodiment, the first triggering state sequentially indicates N reference signal resource sets, the N reference signal resource sets respectively being reference signal resource sets in the N resource configurations; for any given resource configuration among the N resource configurations, when a reporting configured by the first reporting configuration is triggered by the first triggering state and a measurement on reference signal resource(s) in the given resource configuration is used to generate the reporting, a measurement on reference signal resource(s) in only a given reference signal resource set in the given resource configuration is used to generate the reporting; the given reference signal resource set is one of the N reference signal resource sets corresponding to the given resource configuration.

In one subembodiment, the first triggering state indicates the second-type index group corresponding to each reference signal resource in the N reference signal resource sets.

Embodiment 14

Figure 14:
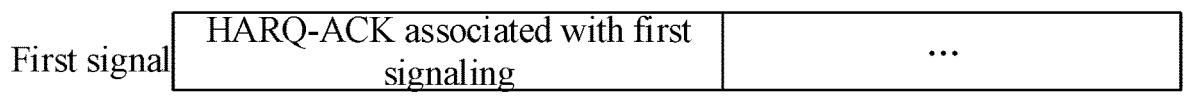
FIG. 14 illustrates a schematic diagram of a first signal according to one embodiment of the present disclosure.

Embodiment 14 illustrates a schematic diagram of a first signal according to one embodiment of the present disclosure, as shown in FIG. 14. In Embodiment 14, the first signal carries a HARQ-ACK associated with the first signaling.

In one embodiment, the first signal comprises a baseband signal.

In one embodiment, the first signal comprises a radio signal.

In one embodiment, the first signal comprises a radio frequency signal.

In one embodiment, the first signal comprises UCI.

In one embodiment, the HARQ-ACK refers to Hybrid Automatic Repeat request-Acknowledgement.

In one embodiment, the HARQ-ACK comprises an ACK.

In one embodiment, the HARQ-ACK comprises a Negative ACKnowledgement (NACK).

In one embodiment, the HARQ-ACK associated with the first signaling only comprises an ACK.

In one embodiment, the HARQ-ACK associated with the first signaling comprises an ACK or a NACK.

In one embodiment, the HARQ-ACK associated with the first signaling comprises: a HARQ-ACK for the first signaling.

In one embodiment, the HARQ-ACK associated with the first signaling comprises: a HARQ-ACK for a PDSCH scheduled by the first signaling.

In one embodiment, the HARQ-ACK associated with the first signaling indicates whether the first signaling is correctly received.

In one embodiment, the HARQ-ACK associated with the first signaling indicates that the first signaling is correctly received.

In one embodiment, the HARQ-ACK associated with the first signaling is used by a transmitter for the first signaling to determine whether the first signaling is correctly received.

In one embodiment, the HARQ-ACK associated with the first signaling is used by a transmitter for the first signaling to determine that the first signaling is correctly received.

In one embodiment, if a transmitter for the first signaling receives the first signal, the transmitter for the first signaling assumes that the first signaling is correctly received.

In one embodiment, if a transmitter for the first signaling does not receive the first signal, the transmitter for the first signaling assumes that the first signaling is not correctly received.

In one embodiment, the first signal is later than the first signaling in time domain.

In one embodiment, the first signaling indicates time-domain resources occupied by the first signal.

In one embodiment, the first signaling indicates a time interval between time-domain resources occupied by the first signal and time-domain resources occupied by the first signaling.

In one embodiment, a spatial domain transmission filter for the first signal is unrelated to the first transmission configuration state.

In one embodiment, the first transmission configuration state is used to determine a spatial domain transmission filter for the first signal.

Embodiment 15

Figure 15:
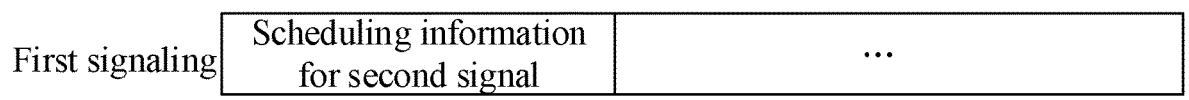
FIG. 15 illustrates a schematic diagram of a first signaling and a second signal according to one embodiment of the present disclosure.

Embodiment 15 illustrates a schematic diagram of a first signaling and a second signal according to one embodiment of the present disclosure, as shown in FIG. 15. In Embodiment 15, the first signaling comprises scheduling information for the second signal.

In one embodiment, the second signal carries at least one of a Transport Block (TB), a Code Block (CB) or a Code Block Group (CBG).

In one embodiment, the scheduling information comprises one or more of time-domain resource, frequency-domain resource, a Modulation and Coding Scheme (MCS), a DMRS port, a Hybrid Automatic Repeat reQuest (HARQ) process number, a Redundancy Version (RV) or a New Data Indicator (NDI).

In one embodiment, the second signal comprises a baseband signal.

In one embodiment, the second signal comprises a radio signal.

In one embodiment, the second signal comprises a radio frequency signal.

In one embodiment, the HARQ-ACK associated with the first signaling comprises: a HARQ-ACK for the second signal.

In one embodiment, the HARQ-ACK associated with the first signaling comprises: a HARQ-ACK for a TB or a CBG carried by the second signal.

In one embodiment, the HARQ-ACK associated with the first signaling indicates whether the second signal is correctly received.

In one embodiment, the HARQ-ACK associated with the first signaling indicates whether a TB or CBG carried by the second signal is correctly received.

In one embodiment, the HARQ-ACK associated with the first signaling indicates that the second signal is correctly received.

In one embodiment, the HARQ-ACK associated with the first signaling indicates that a TB or CBG carried by the second signal is correctly received.

In one embodiment, the first signal is later than the second signal in time domain.

In one embodiment, the first signaling indicates time-domain resources occupied by the second signal, and the first signaling indicates a time interval between time-domain resources occupied by the first signal and time-domain resources occupied by the second signal.

In one embodiment, a TCI state of the second signal is different from the first transmission configuration state.

In one embodiment, a TCI state of the second signal comprises the first transmission configuration state.

Embodiment 16

Embodiment 16 illustrates a schematic diagram of N parameter value sets and N resource configurations according to one embodiment of the present disclosure; as shown in FIG. 16. In Embodiment 16, the first reporting configuration comprises the N parameter value sets, the N parameter value sets respectively corresponding to the N resource configurations; the first parameter value set is one of the N parameter value sets that corresponds to the first resource configuration; the first parameter value set is used by the first node for generating the first information block. In FIG. 16, indexes for the N parameter value sets and the N resource configurations are #0 . . . , and #(N−1), respectively.

In one embodiment, the first information block is unrelated to any parameter value set other than the first parameter value set among the N parameter value sets.

In one embodiment, the first index is used to determine the first parameter value set out of the N parameter value sets.

In one embodiment, any of the N parameter value sets comprises a value of at least one of higher layer parameters "reportQuantity", "reportFreqConfiguration", "timeRestrictionForChannelMeasurements", "timeRestrictionForInterferenceMeasurements", "codebookConfig", "groupBasedBeamReporting", "cqi-Table", "subbandSize" or "non-PMI-PortIndication".

In one embodiment, there are two parameter value sets among the N parameter value sets configuring different values for a same higher layer parameter.

In one embodiment, there are two parameter value sets being the same among the N parameter value sets.

In one embodiment, there are two parameter value sets among the N parameter value sets configuring a same value for each higher layer parameter.

In one embodiment, the phrase that the first parameter value set is used for generating the first information block comprises a meaning that CSI carried by the first information block is generated by a value of a higher layer parameter in the first parameter value set.

In one embodiment, the phrase that the first parameter value set is used for generating the first information block comprises a meaning that the first parameter value set is used for configuring a value of at least one of higher layer parameters "reportQuantity", "reportFreqConfiguration", "timeRestrictionForChannelMeasurements", "timeRestrictionForInterferenceMeasurements", "codebookConfig", "groupBasedBeamReporting", "cqi-Table", "subbandSize" or "non-PMI-PortIndication" corresponding to CSI carried by the first information block.

In one embodiment, the first parameter value set comprises a value of a higher layer parameter "reportQuantity", where content of CSI carried by the first information block is configured by a value of a higher layer parameter "reportQuantity" in the first parameter value set.

In one embodiment, the first parameter value set comprises a value of a higher layer parameter "reportFreqConfiguration", whether a CQI and/or PMI in CSI carried by the first information block is wideband-based or subband-based is configured by a value of a higher layer parameter "reportFreqConfiguration" in the first parameter value set.

In one embodiment, the first parameter value set comprises a value of a higher layer parameter "reportFreqConfiguration", where a CSI reporting band corresponding to CSI carried by the first information block is configured by a value of a higher layer parameter "reportFreqConfiguration" in the first parameter value set.

In one embodiment, the first parameter value set comprises a value of a higher layer parameter "codebookConfig", where a codebook used for generating a PMI carried by the first information block is configured by a value of a higher layer parameter "codebookConfig" in the first parameter value set.

In one embodiment, the first parameter value set comprises a value of a higher layer parameter "subbandSize", where a bandwidth of a subband corresponding to CSI carried by the first information block is configured by a value of a higher layer parameter "subbandSize" in the first parameter value set.

In one embodiment, the first parameter value set comprises a value of a higher layer parameter "groupBasedBeamReporting", whether a CRI carried by the first information block is group beam based is configured by a value of a higher layer parameter "groupBasedBeamReporting" in the first parameter value set.

In one embodiment, the first parameter value set comprises a value of a higher layer parameter "cqi-Table", where a CQI table to which a CQI carried by the first information block belongs is configured by a value of a higher layer parameter "cqi-Table" in the first parameter value set.

In one embodiment, the first parameter value set comprises value(s) of a higher layer parameter "timeRestrictionForChannelMeasurements" and/or a higher layer parameter "timeRestrictionForInterferenceMeasurements, where value(s) of the higher layer parameter "timeRestrictionForChannelMeasurements" and/or the higher layer parameter "timeRestrictionForInterferenceMeasurements" corresponding to CSI carried by the first information block is configured by the first parameter value set.

In one embodiment, the first parameter value set comprises a value of a higher layer parameter "non-PMI-PortIndication", where a value of the higher layer parameter "non-PMI-PortIndication" corresponding to CSI carried by the first information block is configured by the first parameter value set.

Embodiment 17

Embodiment 17 illustrates a schematic diagram of a second information block according to one embodiment of the present disclosure, as shown in FIG. 17. In Embodiment 17, the second information block is used to determine the P transmission configuration states; the first signaling indicates the first transmission configuration state from the P transmission configuration states.

In one embodiment, the second information block is carried by a higher layer signaling.

In one embodiment, the second information block is carried by an RRC signaling.

In one embodiment, the second information block is carried by a MAC CE signaling.

In one embodiment, the second information block is jointly carried by an RRC signaling and a MAC CE.

In one embodiment, the second information block comprises information in all or partial fields in an IE.

In one embodiment, the second information block is an IE.

In one embodiment, the second information block is carried by at least one IE.

In one embodiment, the second information block is jointly carried by an IE and a MAC CE.

In one embodiment, the second information block is jointly carried by at least one IE and at least one MAC CE.

In one embodiment, the second information block comprises information in a fourth higher layer parameter in a second IE; names of the second IE include "PDSCH-Config", while names of the fourth higher layer parameter include "tci-StatesToAddModList".

In one embodiment, the second information block comprises information in a first MAC CE; names of the first MAC CE include "TCI States Activation/Deactivation".

In one embodiment, the first node receives the second information block before receiving the first reporting configuration.

In one embodiment, the first node receives the second information block after receiving the first reporting configuration.

In one embodiment, the P transmission configuration states are for a same Carrier.

In one embodiment, the P transmission configuration states are for a same BWP.

In one embodiment, the second information block indicates the P transmission configuration states.

In one embodiment, any of the P transmission configuration states is a TCI state.

In one embodiment, any of the P transmission configuration states indicates a QCL relation.

In one embodiment, the P transmission configuration states respectively indicate P reference signal resource groups, any of the P reference signal resource groups comprising one or two reference signal resources.

In one subembodiment, any of the P transmission configuration states comprises parameters used for configuring QCL relations between a corresponding reference signal resource group and a DMRS port for a physical layer data channel, a DMRS port for a physical layer control channel, or a reference signal port for reference signal resources.

In one subembodiment, the P reference signal resource groups comprise CSI-RS resources and/or SS/PBCH block resources.

In one embodiment, a reference signal resource indicated by any second-type index in the second-type index group corresponding to any reference signal resource in the N resource configurations is quasi co-located with a reference signal resource in the P reference signal resource groups.

In one embodiment, any reference signal resource indicated by any second-type index in the second-type index group corresponding to a reference signal resource that exists in the N resource configurations is non-quasi co-located with any reference signal resource in the P reference signal resource groups.

In one embodiment, the first transmission configuration state is one of the P transmission configuration states.

In one embodiment, P is no greater than 8.

In one embodiment, P is no greater than 64.

In one embodiment, the P transmission configuration states respectively correspond to P first-type indexes; the P first-type indexes are respectively used for identifying cells associated with reference signal resources indicated by the P transmission configuration states.

In one subembodiment, at least one of the P first-type indexes is a PCI.

In one subembodiment, the P first-type indexes are respectively P PCIs.

In one subembodiment, at least one of the P first-type indexes is a SCellIndex.

In one subembodiment, the P first-type indexes are respectively P SCellIndexes.

In one subembodiment, at least one of the P first-type indexes is a ServCellIndex.

In one subembodiment, the P first-type indexes are respectively P ServCellIndexes.

In one subembodiment, for any transmission configuration state among the P transmission configuration states, if the any transmission configuration state indicates two reference signal resources, the two reference signal resources are associated with a same cell.

In one embodiment, the P transmission configuration states are respectively identified by P second-type indexes.

In one subembodiment, the P second-type indexes are respectively TCI-StateIds corresponding to the P transmission configuration states.

In one subembodiment, any second-type index in the second-type index group corresponding to any reference signal resource in the N resource configurations is one of the P second-type indexes.

In one subembodiment, a second-type index in the second-type index group corresponding to a reference signal resource that exists in the N resource configurations does not belong to the P second-type indexes.

In one embodiment, the second information block comprises a first information sub-block and a second information sub-block; the first information sub-block indicates P1 transmission configuration states, where P1 is a positive integer no less than P; the second information sub-block indicates the P transmission configuration states from the P1 transmission configurations states; the first information sub-blocks is carried by an IE, while the second information sub-block is carried by a MAC CE.

In one subembodiment, the P1 transmission configuration states are for a same BWP.

In one subembodiment, a transmission configuration state identified by any second-type index corresponding to any reference signal resource in the N resource configurations is one of the P1 transmission configuration states.

In one subembodiment, any of the P1 transmission configuration states corresponds to a said first-type index and a said second-type index.

In one embodiment, the first field in the first signaling indicates the first transmission configuration state from the P transmission configuration states; a value of P is used to determine a number of bits (bit size) comprised in the first field in the first signaling.

In one subembodiment, the number of bits comprised in the first field in the first signaling is equal to a minimum positive integer no less than a first numerical value, the first numerical value is equal to a logarithm of the P with a base 2.

Embodiment 18

Embodiment 18 illustrates a structure block diagram of a processing device used in a first node according to one embodiment of the present disclosure; as shown in FIG. 18. In FIG. 18, a processing device 1800 in a first node is comprised of a first receiver 1801 and a first transmitter 1802.

In Embodiment 18, the first receiver 1801 receives a first reporting configuration, and receives a first signaling; and the first transmitter 1802 transmits a first information block.

In Embodiment 18, the first signaling indicates a first transmission configuration state, and the first signaling is used to determine a first time; the first information block comprises a reporting for the first reporting configuration that occurs after the first time; the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations; a measurement on reference signal resource(s) in only the first resource configuration among the N resource configurations is used for generating the first information block, or, the first transmission configuration state is used to determine a spatial relation of reference signal resource(s) in only the first resource configuration among the N resource configurations, or, a measurement on reference signal resource(s) in only the first resource configuration among the N resource configurations is used for generating the first information block and the first transmission configuration state is used to determine a spatial relation of reference signal resource(s) in only the first resource configuration among the N resource configurations.

In one embodiment, any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration; a measurement on reference signal resource(s) in only the first reference signal resource group in the first resource configuration is used for generating the first information block, or, the first transmission configuration state is used to determine a spatial relation of reference signal resource(s) in only the first reference signal resource group in the first resource configuration, or, a measurement on reference signal resource(s) in only the first reference signal resource group in the first resource configuration is used for generating the first information block and the first transmission configuration state is used to determine a spatial relation of reference signal resource(s) in only the first reference signal resource group in the first resource configuration.

In one embodiment, the first receiver 1801 receives a second signaling, the second signaling being used to trigger the first information block, herein, the second signaling indicates a first triggering state, the first triggering state being used to trigger a reporting for the first reporting configuration.

In one embodiment, the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

In one embodiment, the first transmitter 1802 transmits a first signal, herein, the first signal carries a HARQ-ACK associated with the first signaling.

In one embodiment, the first receiver 1801 receives a second signal; herein, the first signaling comprises scheduling information for the second signal.

In one embodiment, the first transmitter 1802 transmits a first signal, the first receiver 1801 receives a second signal, herein, the first signal carries a HARQ-ACK associated with the first signaling; the first signaling comprises scheduling information for the second signal.

In one embodiment, the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

In one embodiment, the first receiver 1801 receives a second information block, herein, the second information block is used to determine P transmission configuration states, where P is a positive integer greater than 1; the first signaling indicates the first transmission configuration state from the P transmission configuration states.

In one embodiment, the first node is a UE.

In one embodiment, the first node is a relay node.

In one embodiment, the first receiver 1801 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1802 comprises at least one of the antenna 452, the transmitter 454, the transmitting processor 468, the multi-antenna transmitting processor 457, the controller/processor 459, the memory 460 or the data source 467 in Embodiment 4.

Embodiment 19

Embodiment 19 illustrates a structure block diagram of a processing device used in a second node according to one embodiment of the present disclosure; as shown in FIG. 19. In FIG. 19, a processing device 1900 in a second node is comprised of a second transmitter 1901 and a second receiver 1902.

In Embodiment 19, the second transmitter 1901 transmits a first reporting configuration, and transmits a first signaling; and the second receiver 1902 receives a first information block.

In Embodiment 19, the first signaling indicates a first transmission configuration state, and the first signaling is used to determine a first time; the first information block comprises a reporting for the first reporting configuration that occurs after the first time; the first reporting configuration comprises N resource configurations, where N is a positive integer greater than 1; the N resource configurations respectively correspond to N first-type indexes, the N first-type indexes being mutually different; any of the N resource configurations comprises at least one reference signal resource set, and any reference signal resource set in the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations; a measurement on reference signal resource(s) in only the first resource configuration among the N resource configurations is used for generating the first information block, or, the first transmission configuration state is used to determine a spatial relation of reference signal resource(s) in only the first resource configuration among the N resource configurations, or, a measurement on reference signal resource(s) in only the first resource configuration among the N resource configurations is used for generating the first information block and the first transmission configuration state is used to determine a spatial relation of reference signal resource(s) in only the first resource configuration among the N resource configurations.

In one embodiment, any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration; a measurement on reference signal resource(s) in only the first reference signal resource group in the first resource configuration is used for generating the first information block, or, the first transmission configuration state is used to determine a spatial relation of reference signal resource(s) in only the first reference signal resource group in the first resource configuration, or, a measurement on reference signal resource(s) in only the first reference signal resource group in the first resource configuration is used for generating the first information block and the first transmission configuration state is used to determine a spatial relation of reference signal resource(s) in only the first reference signal resource group in the first resource configuration.

In one embodiment, the second transmitter 1901 transmits a second signaling, the second signaling being used to trigger the first information block, herein, the second signaling indicates a first triggering state, the first triggering state being used to trigger a reporting for the first reporting configuration.

In one embodiment, the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

In one embodiment, the second receiver 1902 receives a first signal, herein, the first signal carries a HARQ-ACK associated with the first signaling.

In one embodiment, the second transmitter 1901 transmits a second signal; herein, the first signaling comprises scheduling information for the second signal.

In one embodiment, the second receiver 1902 receives a first signal, the second transmitter 1901 transmits a second signal, herein, the first signal carries a HARQ-ACK associated with the first signaling; the first signaling comprises scheduling information for the second signal.

In one embodiment, the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

In one embodiment, the second transmitter 1901 transmits a second information block, herein, the second information block is used to determine P transmission configuration states, where P is a positive integer greater than 1; the first signaling indicates the first transmission configuration state from the P transmission configuration states.

In one embodiment, a device in the second node is a base station.

In one embodiment, a device in the second node is a UE.

In one embodiment, a device in the second node is a relay node.

In one embodiment, the second transmitter 1901 comprises at least one of the antenna 420, the transmitter 418, the transmitting processor 416, the multi-antenna transmitting processor 471, the controller/processor 475 or the memory 476 in Embodiment 4.

In one embodiment, the second receiver 1902 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, vehicles, automobiles, RSU, wireless sensor, network cards, terminals for Internet of Things (IOT), RFID terminals, NB-JOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, Road Side Unit (RSU), drones, test equipment like transceiving device simulating partial functions of base station or signaling tester.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first reporting configuration;
the first receiver, receiving a first signaling, the first signaling indicating a first transmission configuration state, the first signaling being used to determine a first time;
a first transmitter, transmitting a first information block, the first information block comprising a reporting for the first reporting configuration that occurs after the first time;
wherein the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;
a measurement on reference signal resource(s) only in the first resource configuration among the N resource configurations is used to generate the first information block,
or, the first transmission configuration state is used to determine a spatial relation of reference signal resource(s) only in the first resource configuration among the N resource configurations,
or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

2. The first node according to claim 1, wherein any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration;

a measurement on reference signal resource(s) only in the first reference signal resource group in the first resource configuration is used to generate the first information block, or, the first transmission configuration state is used to determine a spatial relation of reference signal resource(s) only in the first reference signal resource group in the first resource configuration, or, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration.

3. The first node according to claim 1, wherein the first receiver receives a second signaling, the second signaling being used to trigger the first information block; wherein the second signaling indicates a first triggering state, the first triggering state being used to trigger a reporting for the first reporting configuration.

4. The first node according to claim 3, wherein the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

5. The first node according to claim 1, wherein the first transmitter transmits a first signal; or, the first receiver receives a second signal; or, the first transmitter transmits a first signal, and the first receiver receives a second signal; wherein the first signal carries a HARQ-ACK associated with the first signaling; the first signaling comprises scheduling information for the second signal.

6. The first node according to claim 1, wherein the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

7. The first node according to claim 1, wherein the first receiver receives a second information block; wherein the second information block is used to determine P transmission configuration states, where P is a positive integer greater than 1; the first signaling indicates the first transmission configuration state from the P transmission configuration states.

8. A second node for wireless communications, comprising:

a second transmitter, transmitting a first reporting configuration;

the second transmitter, transmitting a first signaling, the first signaling indicating a first transmission configuration state, the first signaling being used to determine a first time;

a second receiver, receiving a first information block, the first information block comprising a reporting for the first reporting configuration that occurs after the first time;

wherein the first reporting configuration comprises N resource configurations, where N is a positive integer greater than 1; the N resource configurations respectively correspond to N first-type indexes, the N first-type indexes being mutually different; any of the N resource configurations comprises at least one reference signal resource set, and any reference signal resource set in the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;

a measurement on reference signal resource(s) only in the first resource configuration among the N resource configurations is used to generate the first information block, or, the first transmission configuration state is used to determine a spatial relation of reference signal resource(s) only in the first resource configuration among the N resource configurations, or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

9. The second node according to claim 8, wherein any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration;

a measurement on reference signal resource(s) only in the first reference signal resource group in the first resource configuration is used to generate the first information block, or, the first transmission configuration state is used to determine a spatial relation of reference signal resource(s) only in the first reference signal resource group in the first resource configuration, or, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration.

10. The second node according to claim 8, wherein the second transmitter transmits a second signaling, the second signaling being used to trigger the first information block; wherein the second signaling indicates a first triggering state, the first triggering state being used to trigger a reporting for the first reporting configuration.

11. The second node according to claim 10, wherein the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

12. The second node according to claim 8, wherein the second receiver receives a first signal; or, the second transmitter transmits a second signal; or, the second receiver receives a first signal, and the second transmitter transmits a second signal; wherein the first signal carries a HARQ-ACK associated with the first signaling; the first signaling comprises scheduling information for the second signal.

13. The second node according to claim 8, wherein the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

14. The second node according to claim 8, wherein the second transmitter transmits a second information block; wherein the second information block is used to determine P transmission configuration states, where P is a positive integer greater than 1; the first signaling indicates the first transmission configuration state from the P transmission configuration states.

15. A method in a first node for wireless communications, comprising:
receiving a first reporting configuration;
receiving a first signaling, the first signaling indicating a first transmission configuration state, the first signaling being used to determine a first time;
transmitting a first information block, the first information block comprising a reporting for the first reporting configuration that occurs after the first time;
wherein the first reporting configuration comprises N resource configurations, where N is a positive integer greater than 1; the N resource configurations respectively correspond to N first-type indexes, the N first-type indexes being mutually different; any of the N resource configurations comprises at least one reference signal resource; each reference signal resource in any of the N resource configurations is associated with a same cell, and the first-type index corresponding to any such resource configuration is used for identifying the same cell; the first transmission configuration state corresponds to a first index, the first index being a said first-type index; the first index is used to determine a first resource configuration from the N resource configurations;
a measurement on reference signal resource(s) only in the first resource configuration among the N resource configurations is used to generate the first information block,
or, the first transmission configuration state is used to determine a spatial relation of reference signal resource(s) only in the first resource configuration among the N resource configurations,
or, a measurement on reference signal resource(s) only in the first resource configuration among the N resource configurations is used to generate the first information block, and the first transmission configuration state is used to determine a spatial relation of reference signal resource(s) only in the first resource configuration among the N resource configurations.

16. The method according to claim 15, wherein any reference signal resource in the N resource configurations corresponds to a second-type index group, a said second-type index group comprising at least one second-type index; the first transmission configuration state corresponds to a second index, the second index being a said second-type index; the second index is used to determine a first reference signal resource group from the first resource configuration;
a measurement on reference signal resource(s) only in the first reference signal resource group in the first resource configuration is used to generate the first information block,
or, the first transmission configuration state is used to determine a spatial relation of reference signal resource(s) only in the first reference signal resource group in the first resource configuration,
or, a measurement on reference signal resource(s) only in the first reference signal resource group in the first resource configuration is used to generate the first information block, and the first transmission configuration state is used to determine a spatial relation of reference signal resource(s) only in the first reference signal resource group in the first resource configuration.

17. The method according to claim 15, comprising at least one of:
receiving a second signaling, the second signaling being used to trigger the first information block, wherein the second signaling indicates a first triggering state, the first triggering state being used to trigger a reporting for the first reporting configuration; or
receiving a second information block, wherein the second information block is used to determine P transmission configuration states, where P is a positive integer greater than 1, the first signaling indicates the first transmission configuration state from the P transmission configuration states.

18. The method according to claim 17, wherein the first resource configuration comprises M reference signal resource sets, where M is a positive integer greater than 1; any of the M reference signal resource sets comprises at least one reference signal resource in the first resource configuration; a measurement on reference signal resource(s) only in a first reference signal resource set among the M reference signal resource sets is used to generate the first information block; the first triggering state indicates the first reference signal resource set from the M reference signal resource sets.

19. The method according to claim 15, comprising at least one of:
transmitting a first signal, wherein the first signal carries a HARQ-ACK associated with the first signaling; or
receiving a second signal; wherein the first signaling comprises scheduling information for the second signal.

20. The method according to claim 15, wherein the first reporting configuration comprises N parameter value sets, the N parameter value sets respectively corresponding to the N resource configurations; a first parameter value set is one of the N parameter value sets that corresponds to the first resource configuration; the first parameter value set is used for generating the first information block.

* * * * *